United States Patent
Kitabayashi et al.

(10) Patent No.: US 6,903,827 B2
(45) Date of Patent: Jun. 7, 2005

(54) POSITION ADJUSTING METHOD AND POSITION ADJUSTING SYSTEM OF COLOR COMBINING OPTICAL SYSTEM, POSITION ADJUSTING METHOD AND POSITION ADJUSTING SYSTEM OF OPTICAL MODULATOR, COLOR COMBINING OPTICAL SYSTEM AND PROJECTOR

(75) Inventors: Masashi Kitabayashi, Horigane-mura (JP); Shohei Fujisawa, Matsumoto (JP); Hidetoshi Hashizume, Hotaka-cho (JP)

(73) Assignee: Seiko Epson Corporation, Tokyo (JP)

( * ) Notice: Subject to any disclaimer, the term of this patent is extended or adjusted under 35 U.S.C. 154(b) by 350 days.

(21) Appl. No.: 10/073,182

(22) Filed: Feb. 13, 2002

(65) Prior Publication Data

US 2002/0113976 A1 Aug. 22, 2002

(30) Foreign Application Priority Data

| Feb. 19, 2001 | (JP) | 2001-041700 |
| Feb. 19, 2001 | (JP) | 2001-041701 |
| Aug. 24, 2001 | (JP) | 2001-255124 |

(51) Int. Cl.[7] .............................................. G01B 11/14
(52) U.S. Cl. ........................................ 356/614; 356/622
(58) Field of Search ................................. 356/614, 622; 353/31, 33; 359/831

(56) References Cited

U.S. PATENT DOCUMENTS

| 6,031,587 | A | * | 2/2000 | Okuyama et al. .............. 349/8 |
| 6,320,709 | B1 | * | 11/2001 | Kitabayashi et al. ........ 359/831 |
| 6,345,895 | B1 | * | 2/2002 | Maki et al. .................... 353/33 |
| 6,565,213 | B1 | * | 5/2003 | Yamaguchi et al. .......... 353/33 |
| 6,592,226 | B1 | * | 7/2003 | Fujimori ...................... 353/31 |

* cited by examiner

Primary Examiner—Zandra Smith
Assistant Examiner—Kara Geisel
(74) Attorney, Agent, or Firm—Oliff & Berridge, PLC

(57) ABSTRACT

In order to adjust position of color combining optical system relative to a color separating optical system accommodated in an optical component casing for producing a projector, a white laser beam is irradiated on an optical axis of a light beam passing through the optical component casing and is separated by the color separating optical system, the separated respective color lights being incident on a light-incident end surface of the color combining optical system to be combined, the combined light beam being detected by a sensor, in which the position is adjusted while detecting the combined light beam.

29 Claims, 22 Drawing Sheets

POSITION ADJUSTING METHOD AND POSITION ADJUSTING SYSTEM OF COLOR COMBINING OPTICAL SYSTEM, POSITION ADJUSTING METHOD AND POSITION ADJUSTING SYSTEM OF OPTICAL MODULATOR, COLOR COMBINING OPTICAL SYSTEM AND PROJECTOR

BACKGROUND OF THE INVENTION

1. Field of the Invention

The present invention relates to a position adjusting method and position adjusting system of color combining optical system for adjusting position of the color combining optical system relative to optical component casing which accommodates optical components constituting a color separating optical system of a projector, a color combining optical system adjusted by the position adjusting method, a position adjusting method and position adjusting system of optical modulator for adjusting relative position of a plurality of optical modulators of a projector, and a projector adjusted by the position adjusting method.

2. Description of Related Art

Conventionally, a projector for modulating a plurality of color lights in accordance with image information to project on a screen through a projection lens has been known, which is widely used for multimedia presentation at conference, academic society, exhibition etc.

So-called three-plate projector having a color separating optical system for separating a light beam irradiated by a light source into three color lights of red, green and blue by a dichroic mirror, three optical modulators for modulating the separated light beam for each color light in accordance with image information and a cross dichroic prism for combining the light beam modulated by the respective optical modulators is known as such projector.

The optical components such as the dichroic mirror constituting the color separating optical system and a lens array constituting uniform illuminating optical system are accommodated in an optical component casing established with an optical path extending from the light source to the optical modulator. The optical component casing is composed of an upper casing having a recess for the optical components to be mounted and a lower casing for shutting the lower side of the upper casing. A lens attachment for attaching the projection lens is provided to the lower casing at an end of the optical path.

The three optical modulators are directly attached to a light-incident end surface of the cross dichroic prism. A fixing plate is adhered and fixed to the lower side of the cross dichroic prism attached with the optical modulator and is fixed at the front of the optical path of the projection lens on the lower casing by a screw using a threaded hole formed on the fixing plate.

Such arrangement is adopted because, in fixing the optical modulator on the light-incident end surface of the cross dichroic prism, the relative position of the respective optical modulators has to be determined with high accuracy in order to avoid shift of picture elements etc. Conventionally, the step for accommodating the optical components within the casing and the step for fixing the optical modulator to the cross dichroic prism are independently conducted and both components are combined in the final step.

However, according to the conventional method, appropriate projection image may not be obtained according to dispersion of disposed position of the optical components and inner optical components and fixing position of the fixing plate to the cross dichroic prism. Specifically, when the fixing position of the cross dichroic relative to the fixing plate is shifted, since the fixing plate is fixed to a predetermined position of the lower casing by the screw, the position of the cross dichroic prism is also fixed in accordance therewith. Therefore, the adjustment of the cross dichroic prism in line with the optical axis of the light beam established in the optical component casing is impossible and the color lights cannot be appropriately combined, thereby deteriorating the quality of images projected by the projection lens.

An object of the present invention is to determine the position of the color combining optical system of a projector with high accuracy.

Further, smaller optical modulator is used for recently developed small projector, where the optical path from the light source to the projection lens is shortened and beam-condensation rate of the light of the light source is decreased, so that illumination margin tends to be decreased. Accordingly, in the conventional method where the step for producing the optical component casing and the step for fixing the optical modulator to the cross dichroic prism are separately conducted and the position of the components are adjusted in assembling the both of the components at the final stage, the position of the both assembled components has to be adjusted with small illumination margin, so that there is certain limit in adjustment accuracy.

Another object of the present invention is to cope with the decrease in illumination margin in accordance with size reduction of a projector in adjusting the position of optical modulator.

SUMMARY OF THE INVENTION

A position adjusting method of color combining optical system according to the present invention is used for producing a projector including a light source, a color separating optical system that separates a light beam irradiated by the light source into a plurality of color lights, an optical component casing that accommodates optical components constituting the color separating optical system, a plurality of optical modulators that modulate the respective color lights separated by the color separating optical system in accordance with image information, and a color combining optical system that combines the light beam modulated by the respective optical modulators to form an optical image, the position adjusting method adjusting the position of the color combining optical system relative to the optical components casing, which includes the steps of: irradiating a white laser beam on an optical axis of a light beam passing through the optical component casing; separating the white laser beam by the color separating optical system into the respective color lights to be incident on a light-incident end surface of the color combining optical system and detecting the light beam combined by the color combining optical system by a sensor; and adjusting the position of the color combining optical system relative to the optical component casing while detecting the combined light.

According to the above arrangement, since the laser beam irradiating step, the combined light detecting step and the position adjusting step are conducted in adjusting the position of the color combining optical system, the white laser beam can be separated into a plurality of color lights such as RGB by the color separating optical system to be incident onto the light-incident end surface of the color combining optical system and the position of the color combining optical system relative to the optical component casing can be adjusted while detecting the light beam combined by the color combining optical system, so that the position of the color combining optical system relative to the optical component casing can be determined with high accuracy.

In the above, when the sensor is a point sensor, the completion of the position adjustment may preferably be determined while monitoring detection status in the combined light detecting step.

In the above, the completion of position adjusting step may preferably be determined when the area of the combined light detected by the point sensor becomes the minimum. Incidentally, the minimum area of the combined light spot can be conducted by inputting the detection signal of the sensor into computer etc. through an image importing device such as a video capture board and processing the signal with an image processing software etc.

Since the adjustment completion determining step is provided, in adjusting the position of the color combining optical system, whether the adjustment is completed or not can be automatically determined by a computer etc., so that the position of the color combining optical system can be automatically adjusted using computer etc.

Further, since the completion of position adjustment can be determined when the area of the combined light detected by the point sensor is the minimum, where the single white laser beam separated by the color separating optical system returns to the single white laser beam by the color combining optical system in which the relative position of the optical component casing including the color separating optical system and the color combining optical system can be adjusted at the most appropriate position, the position can be adjusted with high accuracy by a simple determining process.

When the color combining optical system includes a prism that combines the color lights and a fixing plate adhered on the lower side of the prism by a light curing adhesive to be mechanically fixed to the optical component casing, the position adjusting step may preferably be conducted while the light curing adhesive is not cured, and a light may preferably be irradiated to the light curing adhesive to cure the adhesive after determining the adjustment completion. Incidentally, the light beam may preferably be irradiated from the upper side of the prism during the adhesive curing step.

Since the position adjusting step is conducted while the light curing adhesive is not cured, the position of the prism relative to the fixing plate can be freely adjusted, so that the position of the prism can be adjusted at the most suitable position relative to the optical component casing and the light can be irradiated after determining completion of adjustment to cure the light curing adhesive, thereby determining the position of the prism at the most suitable position.

The fixing plate may preferably have a spherical bulging portion formed on a fixing surface of the prism, and the position of the prism may preferably be three-dimensionally adjusted to the fixing plate while the adhesive is not cured and the prism is in contact with the bulging portion.

In adhering and fixing the color-combining prism and the fixing plate in a conventional method, when the prism 150 with inferior cutting accuracy is pressed and fixed to a fixing plate 152 as shown in FIG. 1(a), both surfaces are aligned to incline the vapor evaporation surface and the external side position of the prism 150, so that the prism 150 cannot be disposed on the desired optical axis even after adjusting the position of the prism 150.

In the present invention, as shown in FIG. 1(b), a spherical bulging portion 152B is formed on the end surface of the fixing plate 152 and the color-combining prism 150 is adhered by an ultraviolet curing adhesive 153 while being in contact with the bulging portion 152B of the fixing plate 152, so that the color-combining prism 150 and the bulging portion 152B of the fixing plate 152 are in point-contact, so that the vapor evaporation surface and external side position of the prism 150 can be three-dimensionally adjusted even when the cutting accuracy of the color-combining prism 150 is inferior, thereby securing the accuracy of the vapor evaporation surface and external side position of the prism 150 without being influenced by the cutting accuracy of the prism 150 to securely fix the prism 150 and the fixing plate 152.

The light curing adhesive may preferably be filled so that the gap between the lower side of the prism and the fixing plate formed by the bulging portion of the fixing plate is filled.

According to the above arrangement, since the light curing adhesive is filled so that the gap between the lower side of the color-combining prism 150 and the fixing plate 152 is filled as shown in FIG. 1(b), the lower side of the color-combining prism 150 can be supported not only by point-contact of the bulging portion 152B with the fixing plate 152 but also by the filled ultraviolet cutting adhesive 153, thereby stably maintaining fixing status of the prism 150 and the fixing plate 152.

In the above, the height of the bulging portion of the fixing plate may preferably be from 50 to 100% of maximum tolerance of cutting accuracy on the lower side of the prism, and the curvature radius of the bulging portion may preferably be set so that the area of the bulging portion is from 1 to 50% of the area of the lower side of the prism.

When the height of the bulging portion is less than 50% of the maximum tolerance of cutting accuracy of the lower side of the color-combining prism, the bulging portion 152B of the fixing plate 152 and the lower side of the prism 150 do not contact in adjusting the external side position of the prism 150 as shown in FIG. 2(a), so that the prism 150 cannot be adjusted. On the other hand, when the height of the bulging portion 152B is greater than the maximum tolerance of cutting accuracy A of the lower side of the color-combining prism 150, the lower side of the prism 150 and the fixing plate 152 are separated as shown in FIG. 2(b), so that much amount of ultraviolet adhesive 153 to be filled in the gap between the lower side of the prism 150 and the fixing plate 152 is required, thereby increasing production cost and deteriorating productivity. Accordingly, the height of the bulging portion 152B of the fixing plate 152 may preferably be formed within the range from 50 to 100% of the maximum tolerance of cutting accuracy A of the color-combining prism 150.

When the curvature radius of the bulging portion is determined so that the area of the bulging portion is greater than the area of the lower side of the color-combining prism, the point for the lower side of the prism 150 to be in contact with the bulging portion 152B is away from the center of the prism 150 as shown in FIG. 2(c), so that the prism 150 and the fixing plate 152 are unstably fixed. On the other hand, when the curvature radius of the bulging portion 152B is determined so that the area of the bulging portion 152B is less than 1% of the area of the lower side of the prism 150, the strength of the bulging portion 152B relative to the fixing plate 152 is deteriorated, thereby deteriorating fixing stability of the prism 150 and the fixing plate 152. Accordingly, the curvature radius of the bulging portion 152B may preferably be determined so that the area of the bulging portion 152B becomes 1 to 50% of the lower side of the color-combining prism 150.

A position adjusting system of color combining optical system according to the present invention is used for producing a projector having a light source, a color separating optical system for separating a light beam irradiated by the light source into a plurality of color lights, an optical component casing that accommodates optical components constituting the color separating optical system, a plurality of color modulators that modulate the respective color lights separated by the color separating optical system in accordance with image information, and a color combining optical system that combines the light beam modulated by the respective optical modulators to form an optical image, the position adjusting method adjusting the position of the color combining optical system relative to the optical component casing, the position adjusting system including: a laser beam irradiator that supplies white laser beam on an optical axis of light beam passing through the optical component casing; a combined light sensor that causes the respective color lights generated by separating the white laser beam by the color separating optical system to be incident on a light-incident end surface of the color combining optical system and detects the light beam combined by the color combining optical system; and a position adjuster that adjusts the position of the color combining optical system based on the combined light detected by the combined light sensor.

According to the position adjusting system of color combining optical system of the present invention, the above-described position adjusting method of color-combining optical system can be implemented, thereby obtaining the above-described effects and advantages.

In the above position adjusting system, the combined light sensor may preferably have an adjustment completion determining portion that determines completion of position adjustment of the color combining optical system while monitoring detection status of the combined light. The provision of the adjustment termination determining portion enables to implement the adjustment termination determining step of the above-described position adjusting method.

When the color combining optical system has a prism and a fixing plate adhered on the lower side of the prism by a light curing adhesive to be mechanically fixed to the optical component casing, the position adjuster may preferably have a prism holder that holds the prism and a light beam irradiator that irradiates light that cures the light curing adhesive.

By providing the prism holder and the light irradiator, the adhesive curing step of the above-described position adjusting method can be implemented.

In the above color-combining optical system, the fixing plate may preferably have a spherical bulging portion formed on the fixing surface of the prism, and the prism may preferably be adhered on the fixing plate while at least a part of the prism is in contact with the bulging portion.

According to the above arrangement, since the fixing plate has the spherical bulging portion formed on the fixing surface of the prism and the prism is adhered while at least a part of the prism is in contact with the bulging portion, the position of the prism can be three-dimensionally adjusted relative to the fixing plate, so that the same effects and advantages as the above-described position adjusting method can be obtained.

The light curing adhesive may preferably be coated so that the gap between the lower side of the prism and the fixing plate formed by the bulging portion of the fixing plate is filled.

Further, the height of the bulging portion of the fixing plate may preferably be from 50 to 100% of maximum tolerance of cutting accuracy on the lower side of the prism, and the curvature radius of the bulging portion may preferably be set so that the area of the bulging portion is from 1 to 50% of the area of the lower side of the prism.

According to the above arrangement, the color-combining optical system of which position is adjusted with high accuracy can be stably held by the light curing adhesive interposed between the prism and the fixing plate and the bulging portion formed with the above appropriate dimension.

A position adjusting system of optical modulator according to the present invention is used for producing a projector having a light source, a color separating optical system for separating a light beam irradiated by the light source into a plurality of color lights, an optical component casing that accommodates optical components constituting the color separating optical system, a plurality of color modulators that modulate the respective color lights separated by the color separating optical system in accordance with image information, and a color combining optical system that combines the light beam modulated by the respective optical modulators to form an optical image, the position adjusting system adjusting relative position of the plurality of color combining optical systems, including: an adjuster body onto which an object to be adjusted including the optical modulator and the optical component casing is mounted to adjust position of the respective optical modulators; a transmissive screen onto which an enlarged image projected from the object to be adjusted is formed; an image sensor provided on the backside of the transmissive screen to detect the projection image projected on the transmissive screen; and an optical axis sensor that detects an illumination optical axis set in the optical component casing, the optical modulator being adjusted by the adjustor body based on the illumination optical axis detected by the optical axis sensor.

The optical axis sensor may preferably include: a light beam output that outputs a linear light beam along the illumination optical axis; a light beam sensor that detects the light beam irradiated by the light beam output; and an optical axis processor that calculates the position of the illumination optical axis based on the light beam detected by the light beam sensor.

Image sensors such as CCD (Charge Coupled Device) may be used as the light beam sensor and an image processing program executed on an OS (Operating System) for controlling the operation of computer to which the signal from the image sensor is inputted via an image importing device may be used as the optical axis processor.

According to the position adjusting system of optical modulator of the present invention, since the mutual position of the optical modulators relative to the adjuster body can be adjusted while checking the illumination optical axis set in the optical component casing by the optical axis sensor, the position of the mutual optical modulators can be adjusted after adjusting the position of the optical modulator relative to the optical component casing with high accuracy, so that a small projector having small illumination margin can be suitably produced.

In the above, the adjuster body may preferably include: a holder that holds the optical modulator; a position adjuster that adjusts the position of the optical modulator held by the holder; and a light beam feeder that supplies adjusting light beam to the optical modulator, the holder having a light beam transmitting hole that introduces the light beam from the light beam feeder to an image formation area of the optical modulator.

According to the present invention, since the holder and the light beam feeder are provided, the position of the optical modulator can be adjusted by supplying adjusting light beam similar to the actual light beam irradiated by the light source inside the optical component casing, so that the position of the optical modulator can be adjusted with high accuracy considering accuracy of the position of the optical components inside the casing.

Further, since the adjusting light beam can be introduced to the image formation area of the optical modulator only by forming the light beam transmitting hole to the holder, the position adjusting system of optical modulator capable of highly accurate position adjustment can be constructed with a simple structure.

When the optical modulator is fixed on a light-incident end surface of the color combining optical system with a light curing adhesive, the holder may preferably have a light irradiator that cures the light curing adhesive.

According to the present invention, since the light irradiator is provided to the holder, the position of the optical modulator can be determined and fixed by irradiating light from the light irradiator immediately after adjusting the position of the optical modulator by the holder, so that the position of the optical modulator can be quickly determined and fixed, thereby enhancing production of the projector.

A position adjusting method of optical modulator of the present invention is used for producing a projector including a light source, a color separating optical system that separates a light beam irradiated by the light source into a plurality of color lights, an optical component casing that accommodates optical components constituting the color separating optical system, a plurality of optical modulators that modulate the respective color lights separated by the color separating optical system in accordance with image information, and a color combining optical system that combines the light beam modulated by the respective optical modulators to form an optical image, the position adjusting method adjusting the relative position of the plurality of color combining optical systems, the method including the steps of: irradiating a laser beam along an illumination optical axis established in the optical component casing; detecting the irradiated laser beam; calculating the illumination optical axis of the optical component casing based on the detected laser beam; and adjusting the relative position of the optical modulators based on the position of the calculated optical axis of the optical component casing.

According to the present invention, since the laser beam irradiating step, the laser beam detecting step and the optical axis position calculating step are provided, the position of the optical modulator can be adjusted while checking the optical axis position of the optical component casing constituting the object to be adjusted. Accordingly, the position of the optical modulator can be adjusted with high accuracy while considering the optical axis position of the optical component casing in adjusting the position of the optical modulator during the position adjusting step, so that the method can be suitably used for producing a small projector of small illumination margin and the production cost can be reduced by reducing the time required for adjusting the position of the optical modulator. Further, according to a projector having an optical modulator of which position is adjusted according to the above method, a small projector of high image quality can be obtained.

DETAILED DESCRIPTION OF PREFERRED EMBODIMENT(S)

An embodiment of the present invention will be described below with reference to attached drawings.

[1. Structure of Projector]

Figure 1A:
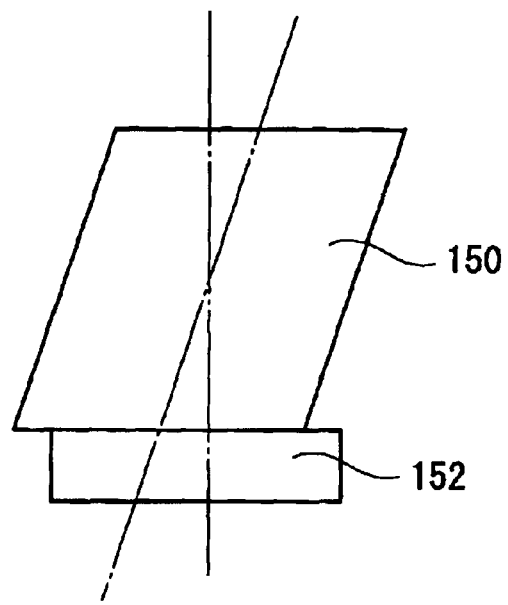
FIG. 1(a) and FIG. 1(b) are side elevational views showing an attachment structure of a color combining optical system for explaining a function of the present invention.
Figure 1B:
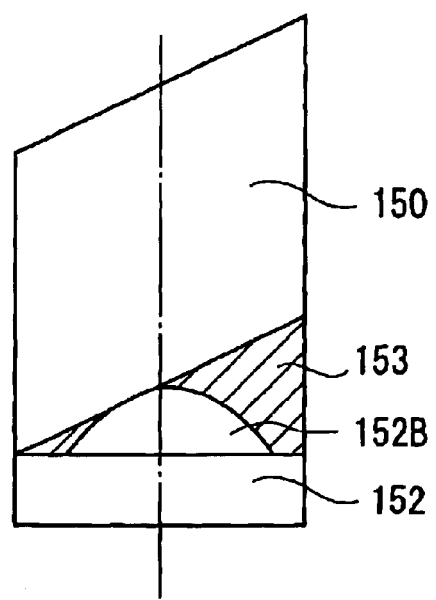
Figure 2A:
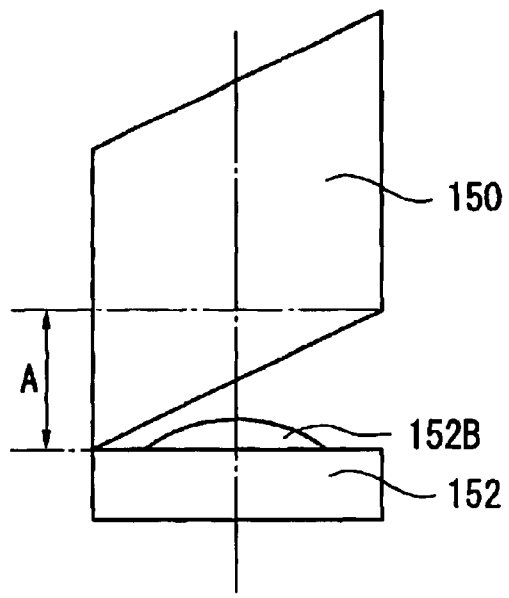
FIG. 2(a) to FIG. 2(d) are side elevational views showing an attachment structure of a color combining optical system for explaining a function of the present invention.
Figure 2B:
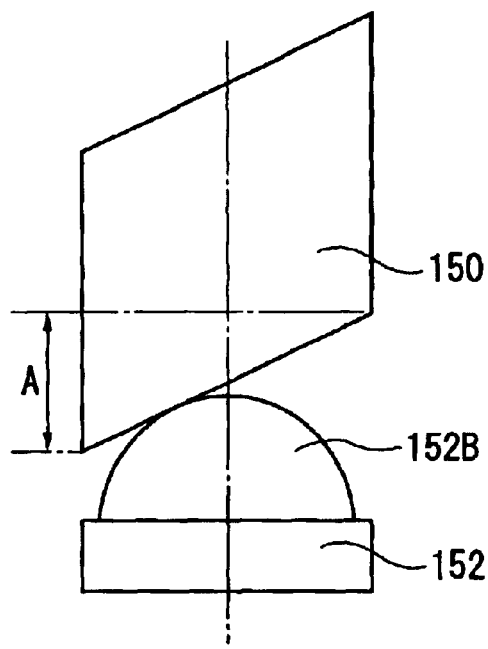
Figure 2C:
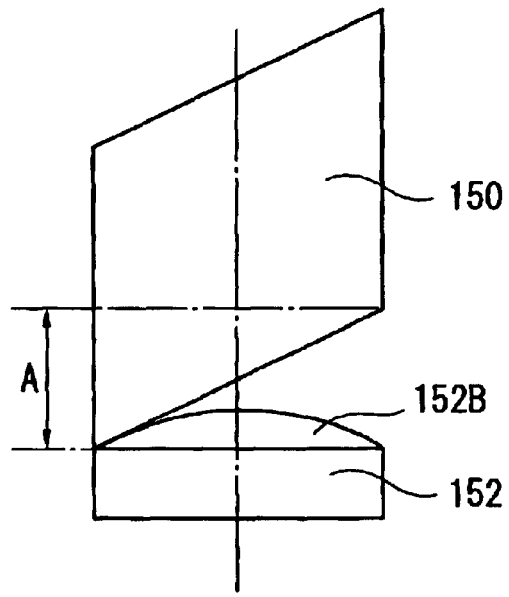
Figure 2D:
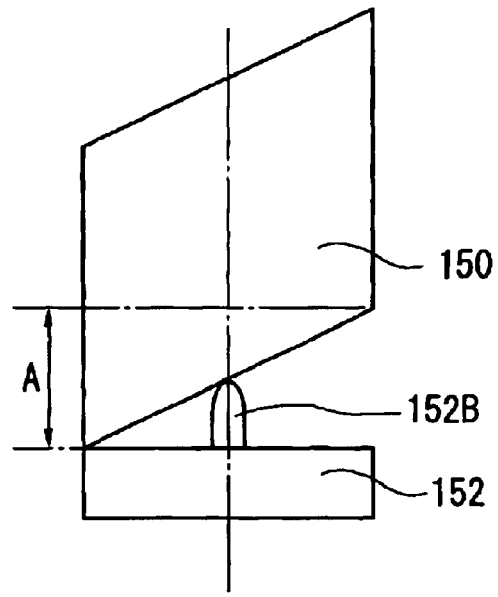
Figure 3:
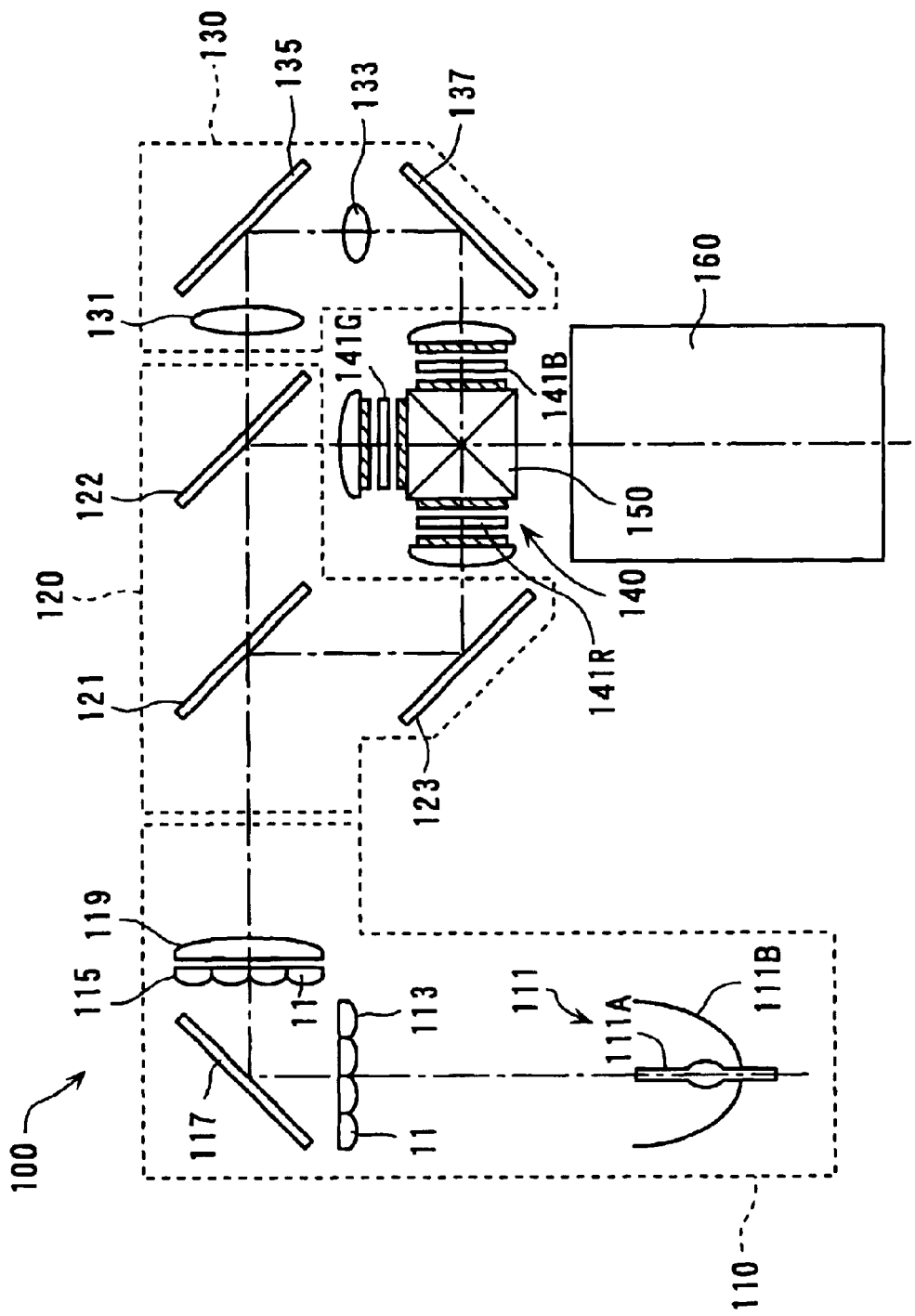
FIG. 3 is a schematic illustration showing a structure of an optical unit to be adjusted by a position adjusting method according to an embodiment of the present invention.

FIG. 3 shows an arrangement of a projector 100 using an optical unit including a color separating optical system, a plurality of optical modulator, a color combining optical system and a projection optical system to be adjusted by the position adjusting system of the optical modulator according to an embodiment of the present invention. The projector 100 has an integrator illuminating optical system 110, a color separating optical system 120, a relay optical system 130, an electric optical device 140, a cross dichroic prism 150 as the color combining optical system and a projection lens 160 as the projection optical system.

The integrator illuminating optical system 110 has a light source 111 including a light source lamp 111A and a reflector 111B, a first lens array 113, a second lens array 115, a reflection mirror 117 and a superimposing lens 119.

The irradiating direction of the light beam irradiated by the light source lamp 111A is aligned by the reflector 111B and the light beam is separated into a plurality of sub-beams by the first lens array 113. After the irradiating direction of the light beam is bent by the reflection mirror 117 for ninety degrees, the light beam is focused on a neighborhood of the second lens array 115. The respective sub-beams irradiated by the second lens array 115 are incident on the incident surface of the subsequent superimposing lens 119 in a manner that the central axis (main beam) thereof becomes perpendicular thereto. Further, the plurality of sub-beams irradiated by the superimposing lens 119 is superimposed on three liquid crystal panels 141R, 141G and 141B constituting below-described electric optical device 140.

The color separating optical system 120 has two dichroic mirrors 121 and 122 and a reflection mirror 123, the dichroic mirrors 121 and 122 and the reflection mirror 123 separating the plurality of sub-beams irradiated by the integrator illuminating optical system 110 into three color lights of red, green and blue.

The relay optical system 130 includes an incident-side lens 131, a relay lens 133 and reflection mirrors 135 and 137, the relay optical system introducing the color light separated by the color separating optical system 120, for instance, blue light B, to the liquid crystal panel 141B.

The electric optical device 140 has the liquid crystal panels 141R, 141G and 141B as three optical modulators using, for instance, polysilicon TFT as a switching element. The respective color lights separated by the color separating optical system 120 are modulated by the three liquid crystal panels 141R, 141G and 141B in accordance with image information to form an optical image.

The cross dichroic prism 150 as a color combining optical system combines images modulated for every color light irradiated by the three liquid crystal panels 141R, 141G and 141B to form a color image. Incidentally, in the cross dichroic prism 150, dielectric multi-layer film for reflecting red light and a dielectric multi-layer film for reflecting blue light are formed in approximate X-shape along a border of four right-angle prisms, the dielectric multi-layer films combining the three color lights. The color image combined by the cross dichroic prism 150 is irradiated by the projection lens 160 and is enlarged and projected on the screen.

[2. Structure of Optical Unit to be Adjusted]

Figure 4:
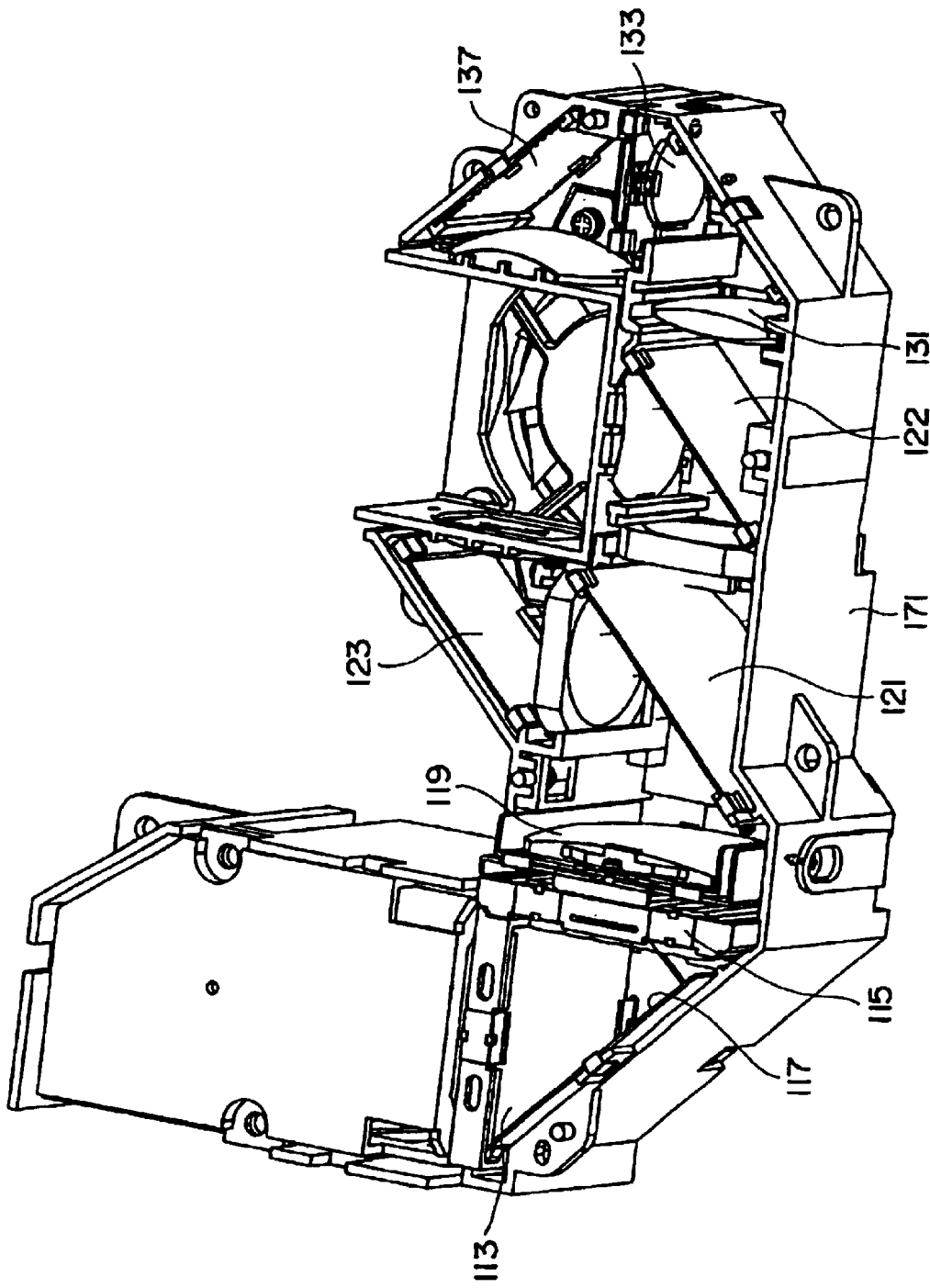
FIG. 4 is an overall perspective view showing a structure of an optical component casing according to the aforesaid embodiment.

In the projector 100, the optical components constituting the integrator illuminating optical system 110, the color separating optical system 120 and the relay optical system 130 are accommodated inside an upper light guide 171 as shown in FIG. 4 and are attached to the inside of the upper light guide 171 by a clip etc.

Figure 5:
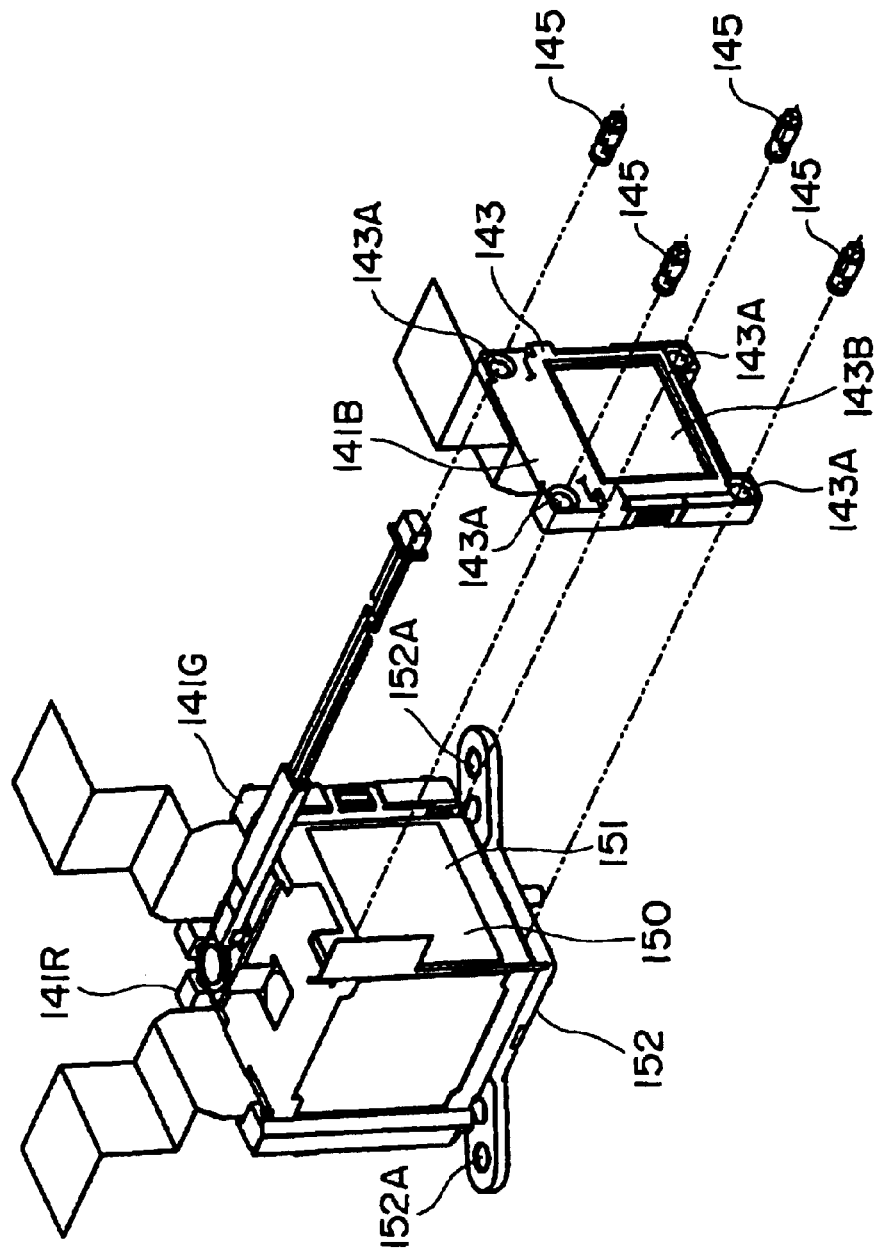
FIG. 5 is an overall perspective view showing a structure for attaching an optical modulator to a color combining optical system of the aforesaid embodiment.

The three liquid crystal panels 141R, 141G and 141B constituting the electric optical device 140 surround the three sides of the cross dichroic prism 150. Specifically, as shown in FIG. 5, the respective liquid crystal panels 141R, 141G and 141B are accommodated in a holding frame 143 and are fixed on the cross dichroic prism 150 by a POP (Panel On Prism) structure where the liquid crystal panels are adhered and fixed on a beam-incident end surface 151 of the cross dichroic prism 150 of the cross dichroic prism 150 by inserting a transparent resin pin 145 to a hole 143A formed on four corners of the holding frame 143 together with an ultraviolet curing adhesive. A rectangular opening 143B is formed on the holding frame 143 through which the respective liquid crystal panels 141R, 141G and 141B are exposed to form an image formation area. In other words, the respective color lights R, G and B are introduced to the exposed part of the respective liquid crystal panels 141R, 141G and 141B to form an optical image in accordance with image information.

Figure 6:
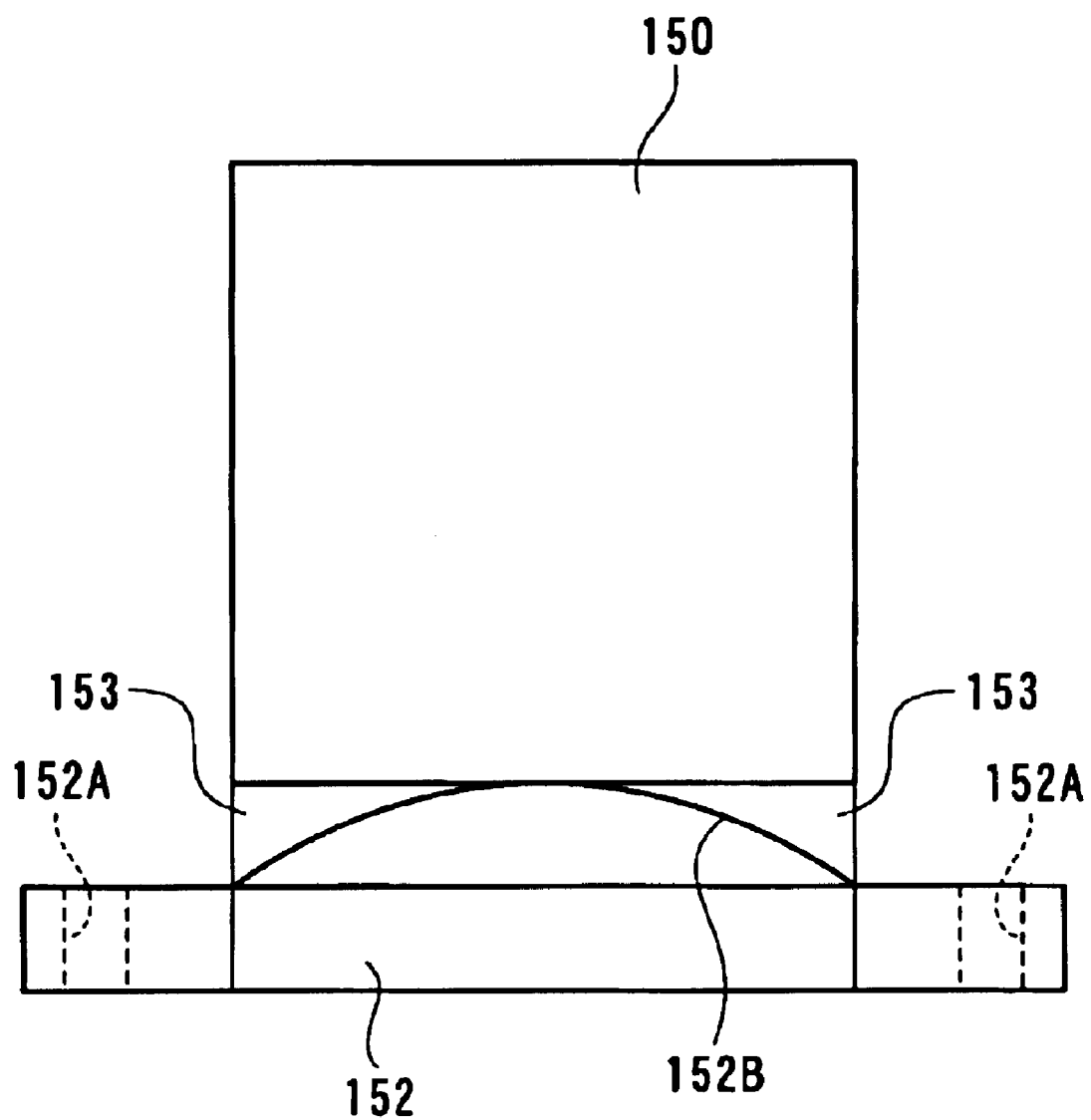
FIG. 6 is a side elevational view showing an attachment structure of the color combining optical system according to the aforesaid embodiment.

A fixing plate 152 is adhered and fixed on the lower side of the cross dichroic prism 150 by an ultraviolet curing adhesive, the fixing plate 152 having a hole 152A for screwing. As shown in FIG. 6, the fixing plate 152 has a spherical bulging portion 152B at the central portion thereof. The position of the cross dichroic prism 150 is adjusted while the lower side of the cross dichroic prism 150 is in contact with the bulging portion 152B and the pre-cured ultraviolet curing adhesive 153 is filled between the cross dichroic prism 150 and the fixing plate 152. After completion of position adjustment, the ultraviolet is irradiated from the upper side of the cross dichroic prism 150 to the lower side thereof to cure the ultraviolet curing adhesive 153. Incidentally, the spherical bulging portion 152B is formed on the fixing plate 152 because vertically swiveling position adjustment relative to the optical axis is required.

Figure 7:
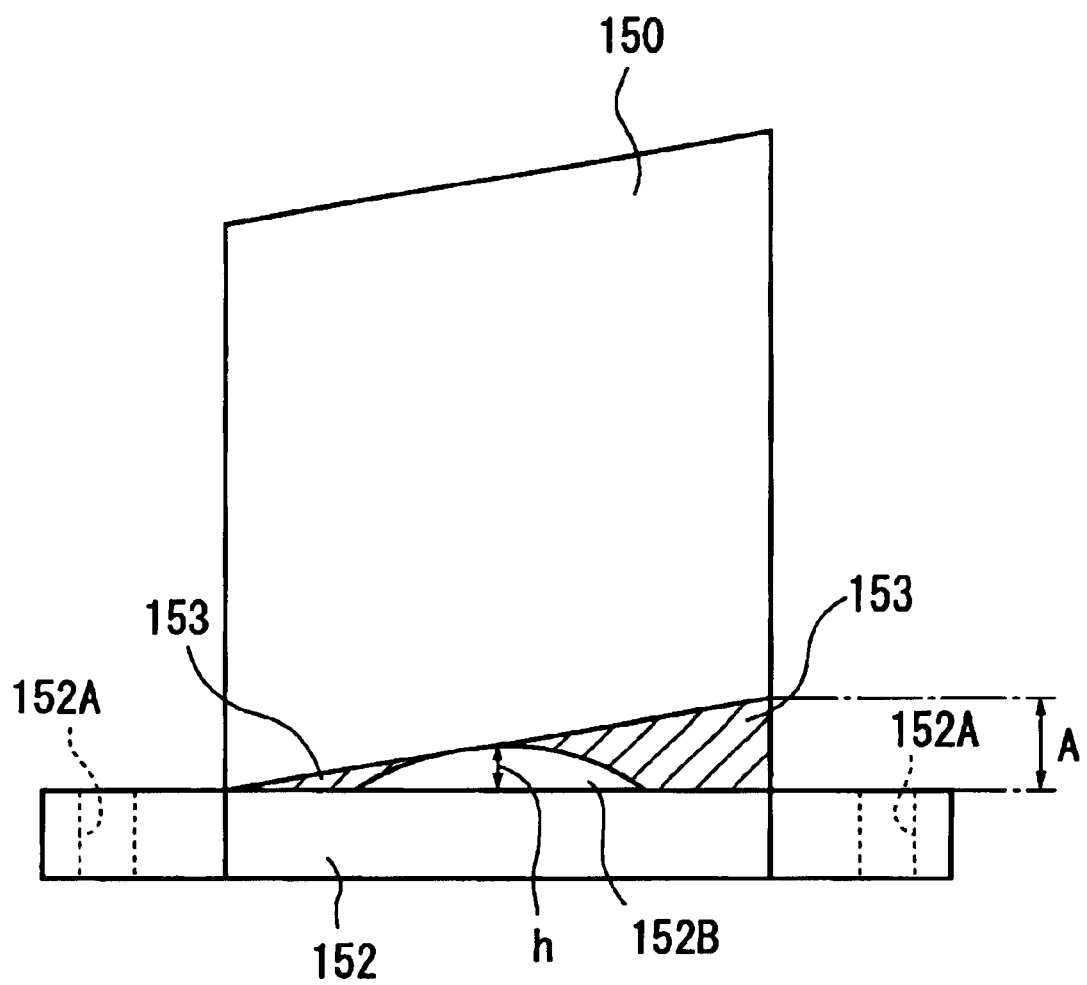
FIG. 7 is a side elevational view showing an attachment structure of the color combining optical system according to the aforesaid embodiment.

In producing actual cross dichroic prism 150, tolerance is generated as shown in FIG. 7. In the present embodiment, the cross dichroic prism 150 is stably supported by setting the height h and the curvature radius R of the spherical bulging portion 152B at an appropriate dimension relative to the maximum tolerance of cutting accuracy A of the cross dichroic prism 150. Specifically, when the maximum tolerance of cutting accuracy of the cross dichroic prism 150 is A, the height h of the bulging portion 152B is set as ½*A. Further, when the area of the lower side of the cross dichroic prism 150 is Sa, the curvature radius of the bulging portion 152B is set so that the surface area Sb of the bulging portion 152B becomes ½*Sa. By thus forming the shape of the bulging portion 152B, the bulging portion 152B and the cross dichroic prism 150 are in point-contact at the central portion, thereby stably supporting and fixing the cross dichroic prism 150.

Figure 8:
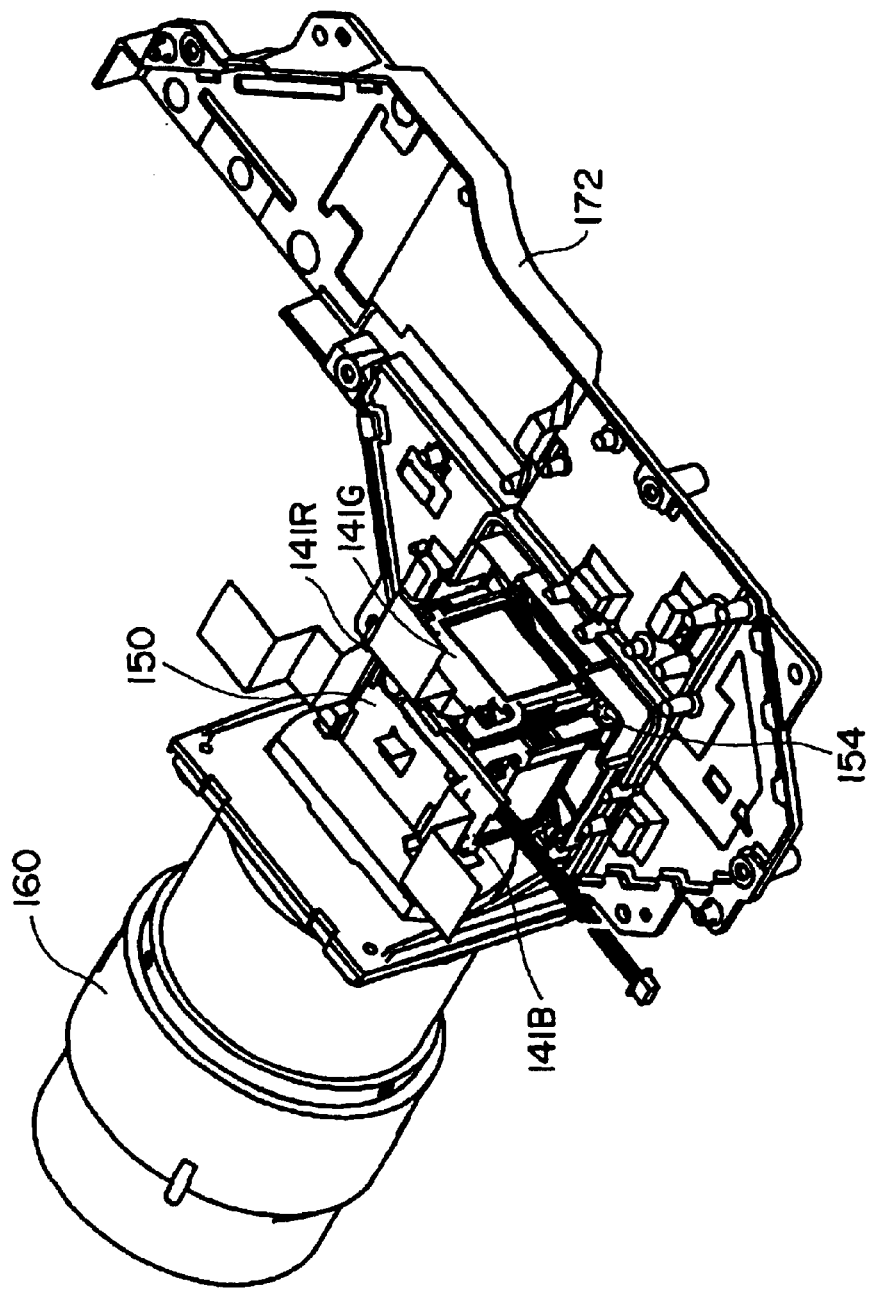
FIG. 8 is an overall perspective view showing a structure of the optical component casing of the aforesaid embodiment.

As shown in FIG. 8, the cross dichroic prism 150 and the liquid crystal panels 141R, 141G and 141B are fixed to the lower light guide 172 by inserting the screw 154 to the hole 152A of the fixing plate 152. The upper light guide 171 and the lower light guide 172 are combined to form the optical unit. The upper light guide 171 and the lower light guide 172 constitute the optical component casing.

In thus arranged optical unit, the optical component constituting the integrator illuminating optical system 110, the color separating optical system 120 and the relay optical system 130 is accommodated inside the upper light guide 171. Subsequently, the cross dichroic prism 150 and the liquid crystal panels 141R, 141G and 141B are attached to the lower light guide 172 while the fixing adhesive is not cured. Then, after assembling the upper light guide 171 and the lower light guide 172, the position of the cross dichroic prism 150 and the liquid crystal panels 141R, 141G and 141B are adjusted using the light beam irradiated by the light source and, at the final step, the adhesive is cured to determine the position of the cross dichroic prism 150 and the liquid crystal panels 141R, 141G and 141B.

[3. Structure of Position Adjusting System of Optical Modulator]

Figure 9:
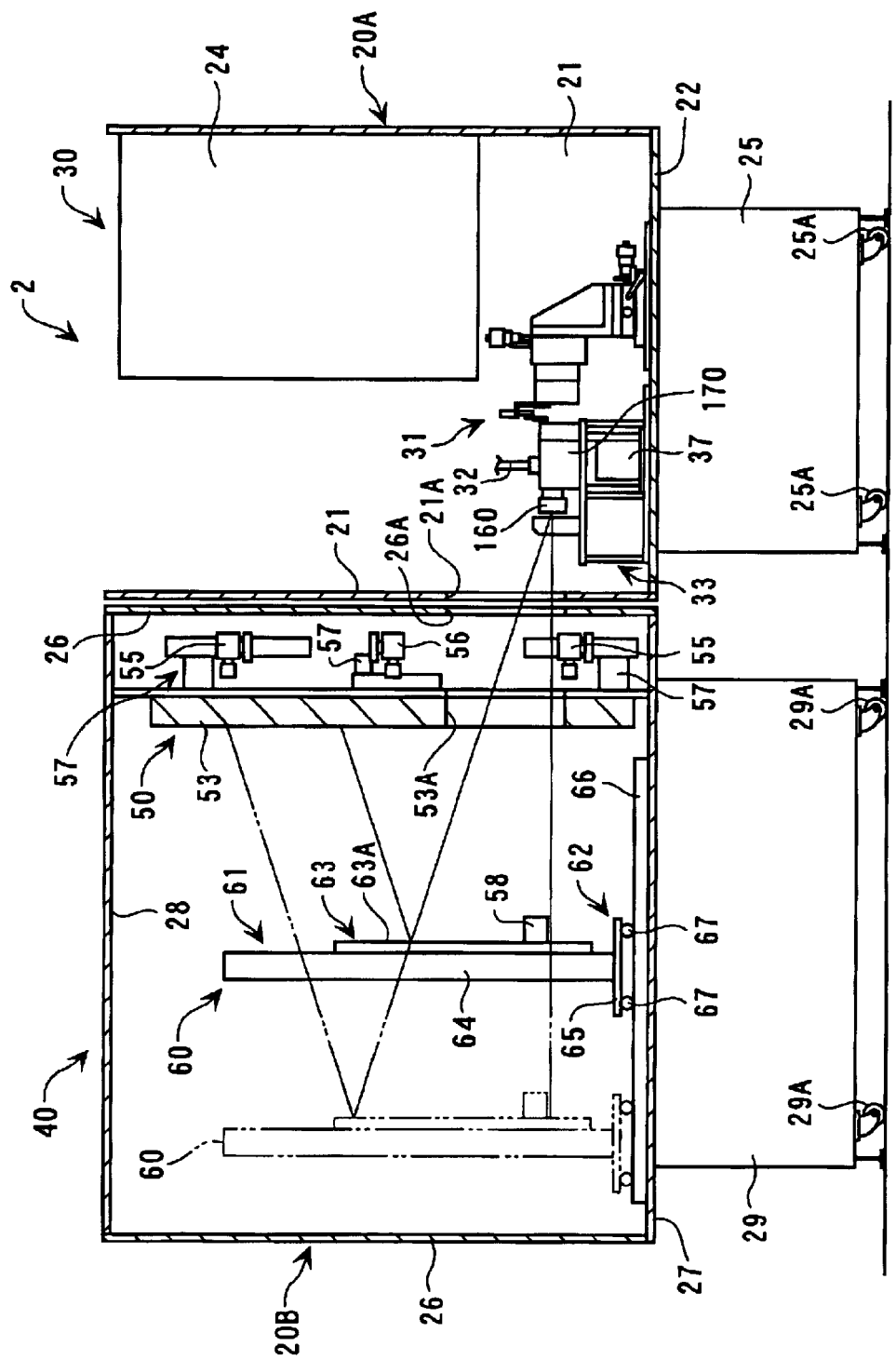
FIG. 9 is a side elevational view representing a structure of the position adjusting system of the optical modulator for implementing the position adjusting method of the color combining optical system of the aforesaid embodiment.
Figure 10:
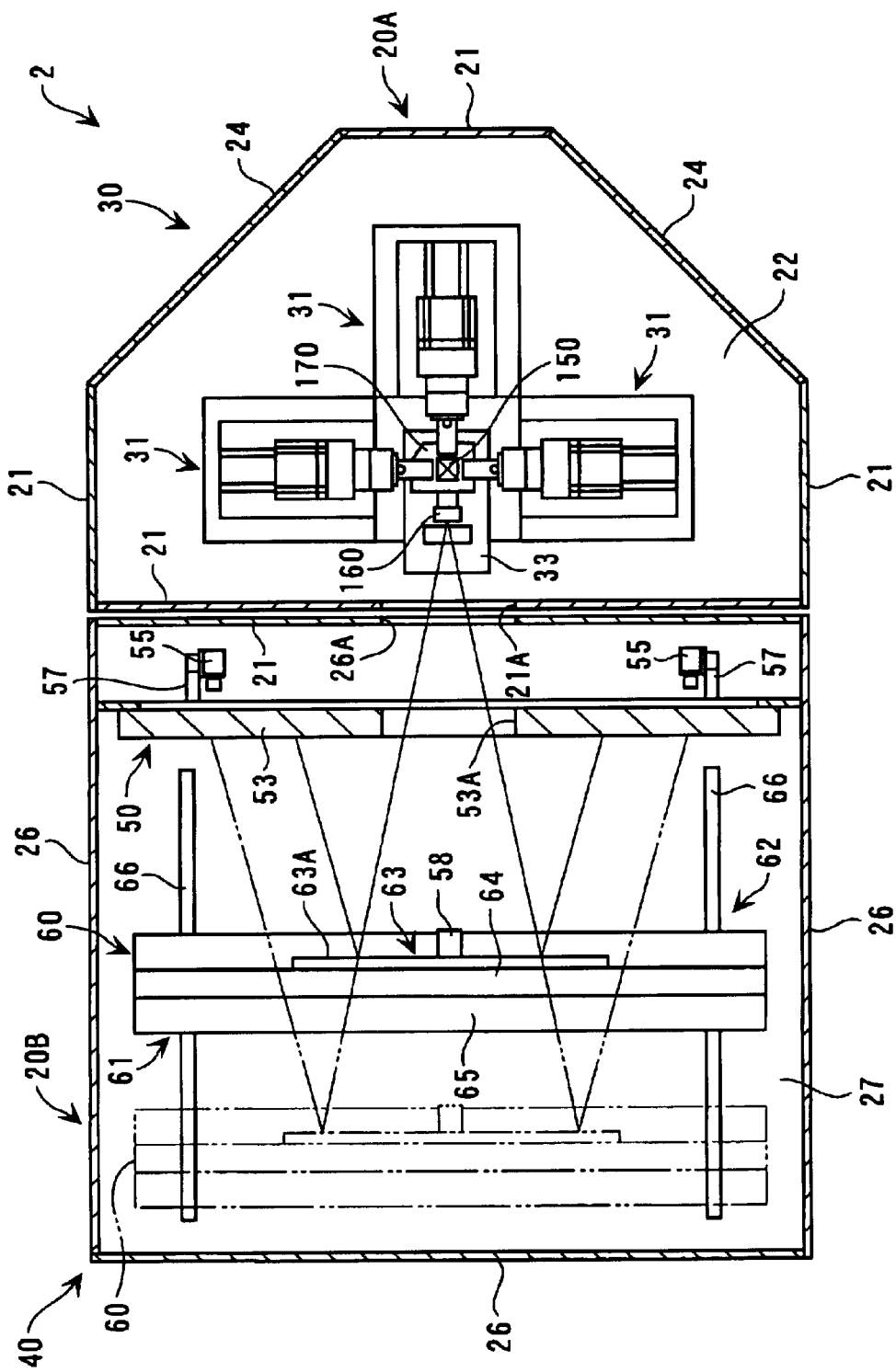
FIG. 10 is a plan view showing a structure of the position adjusting system of the optical modulator of the aforesaid embodiment.

A position adjusting system 2 for adjusting the position of the liquid crystal panels 141R, 141G and 141B and the cross dichroic prism 150 constituting the optical unit is shown in FIGS. 9 and 10. The position adjusting system 2 is basically composed of an adjuster body 30 to be an adjusting device body and a projector body 40. As shown in FIG. 9, the optical unit 170 is mounted on the adjuster body 30 for position adjustment.

The adjuster body 30 has a UV light-shielding cover 20A, three six-axis position adjusting units 31 for adjusting position of the liquid crystal panels 141R, 141G and 141B, a prism position adjusting unit 32 for adjusting the position of the cross dichroic prism 150, and a light source unit 37 for irradiating white laser beam for determining optical axis position and adjusting light.

The UV light-shielding cover 20A includes a side plate 21 surrounding the six-axis position adjusting unit 31, a bottom plate 22, a door 24 openably provided to the side plate 21, and a platform 25 provided on a lower part thereof. A transmissive window 21A for transmitting the light irradiated by the light source unit 37 and transmitted through the projection lens 160 to the projector body 40 is provided to the side plate 21.

The door 24 is used in adjusting the six-axis position adjusting unit 31 in providing and removing the optical unit 170 to be adjusted, which is formed of acrylic plate transmitting no ultraviolet. The platform 25 has a caster 25A at a lower part thereof so that the adjuster body 30 can be easily moved in installing the device.

The projector body 40 has a screen unit 50, a reflecting device 60 and a darkroom 20B. The darkroom 20B has a side plate 26, a bottom plate 27 and a top plate 28 surrounding the screen unit 50 and the reflecting device 60, and a platform 29. A transmissive window 26A for transmitting the light irradiated by the light source unit 37 through the optical unit 170 is provided to the side plate 26 and a caster 29A is provided on a lower part of the platform 29.

(3-1) Structure of Adjuster Body

A six-axis position adjusting unit 31 and a clamp jig 33 for supporting and fixing the optical unit 170 to be supported are provided inside the UV light-shielding cover 20A of the adjuster body 30. The light source unit 37 is provided below the surface of the clamp jig 33 on which the optical unit 170 is mounted. The prism position adjusting unit 32 capable of three-dimensional movement is provided above the clamp jig 33 of the adjuster body 30. Incidentally, though not shown in FIG. 9, the adjuster body 30, a computer 70 (described below) as a controller for controlling the screen unit 50 and the reflecting device 60, and a fixing ultraviolet light source device for curing the ultraviolet curing adhesive to fix the liquid crystal panels 141R, 141G and 141B of the optical unit 170 on the cross dichroic prism 150 are provided below the platform 25.

Figure 11:
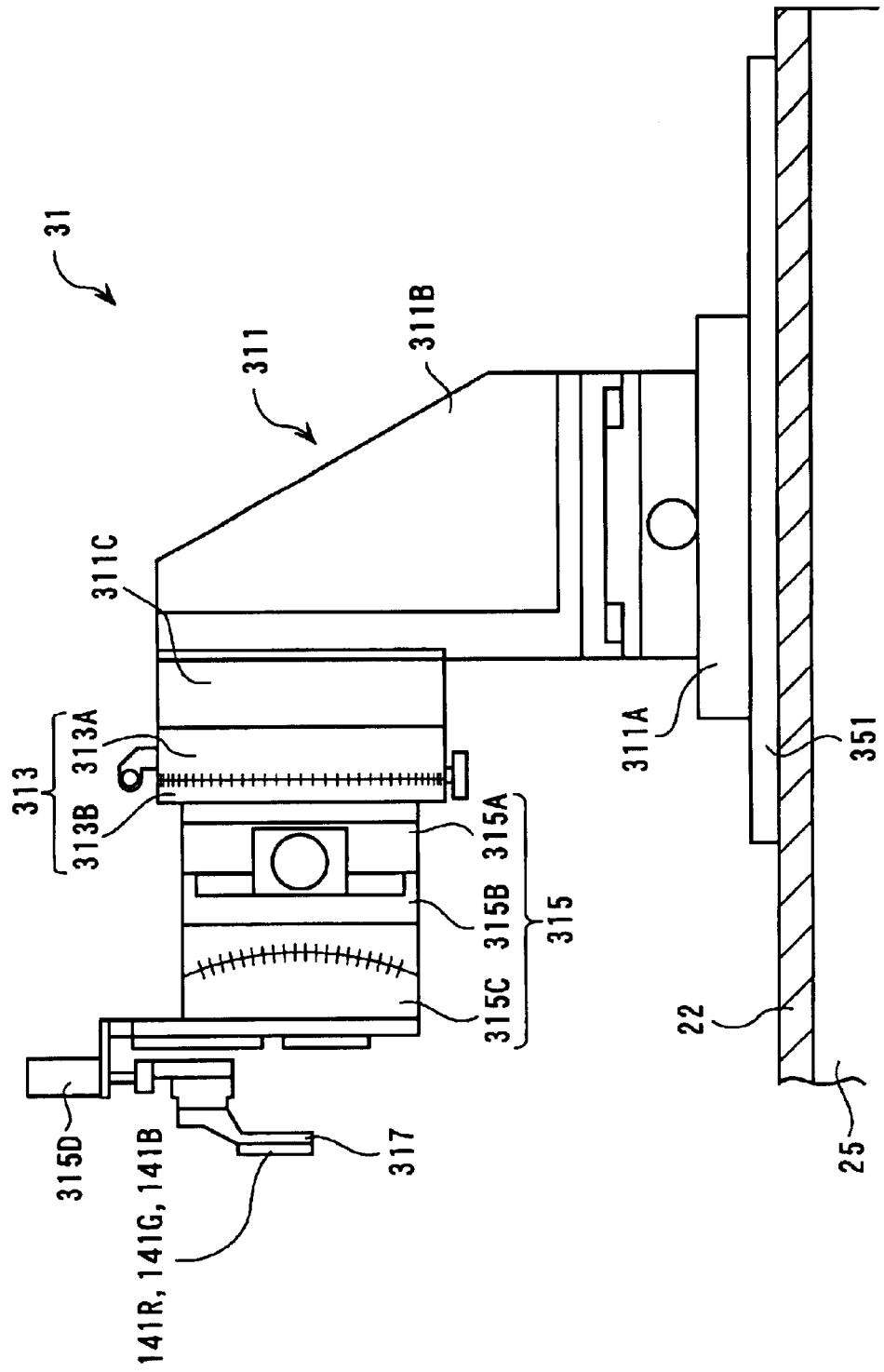
FIG. 11 is a side elevational view showing a structure of the position adjusting mechanism of the optical modulator of the aforesaid embodiment.

The six-axis position adjusting unit 31 is for adjusting the disposition of the liquid crystal panels 141R, 141G and 141B relative to the light-incident end surface 151 of the cross dichroic prism 150. As shown in FIG. 11, the six-axis position adjusting unit 31 has a planar position adjuster 311 movable along a rail 351 of the bottom plate 22 of the UV light-shielding cover 20, an in-plane rotary position adjuster 313 provided at a distal end of the planar position adjuster 311, an out-plane rotary position adjuster 315 provided at a distal end of the in-plane rotary position adjuster 313 and a liquid crystal panel holder 317 provided at a distal end of the out-plane rotary position adjuster 315.

The planar position adjuster 311 adjusts the advancement and retraction position and planar position of the cross dichroic prism 150 relative to the light beam-incident end surface 151, which includes a base 311A slidably provided on the platform 25, a leg 311B vertically mounted on the base 311A, and a connector 311C provided on the upper distal portion of the leg 311B for the in-plane rotary position adjuster 313 to be connected. The base 311A moves in Z-axis direction (right and left direction in FIG. 11) of the platform 25 by a drive mechanism such as a motor (not shown). The leg 311B moves in X-axis direction (a direction orthogonal with surface of FIG. 11) relative to the base 311A by a drive mechanism such as a motor (not shown) provided on a side thereof. The connector 311C moves in Y-axis direction (up and down direction in FIG. 11) relative to the leg 311B by a drive mechanism such as a motor (not shown).

The in-plane rotary position adjuster 313 adjusts the in-plane rotary position of the liquid crystal panels 141R, 141G and 141B relative to the light beam-incident end surface 151 of the cross dichroic prism 150, which includes a cylindrical base 313A fixed to a distal end of the planar position adjuster 311 and a rotation adjuster 313B rotatable in the circumferential direction of the base 313A. By adjusting the rotary position of the rotation adjuster 313B, the in-plane rotary position of the liquid crystal panels 141R, 141G and 141B relative to the light beam-incident end surface 151 can be adjusted with high accuracy.

The out-plane rotary position adjuster 315 adjusts the out-plane rotary position of the liquid crystal panels 141R, 141G and 141B relative to the light beam-incident end surface 151 of the cross dichroic prism 150. The out-plane rotary position adjuster 315 has a base 315A fixed to a distal end of the in-plane rotary position adjuster 313 and provided with a concave curved surface having horizontally extending arc, a first adjuster 315B slidable along the concave curved surface of the base 315A and provided with a concave curved surface having perpendicularly extending arc, and a second adjuster 315C slidable along the arc on the curved surface of the first adjuster 315B. When the motor (not shown) provided on the side of the base 315A is rotated, the first adjuster 315B is slid. When the motor (not shown) provided on the upper side of the first adjuster 315B is rotated, the second adjuster 315C is slide, so that the out-plane rotary position of the liquid crystal panels 141R, 141G and 141B relative to the light beam-incident end surface 151 can be adjusted with high accuracy.

The liquid crystal panel 317 holds the liquid crystal panels 141R, 141G and 141B to be adjusted, which is provided at a distal portion of the second adjuster 315C and is movable in Y-axis direction by an actuator 315D provided to the second adjuster 315C.

Figure 12:
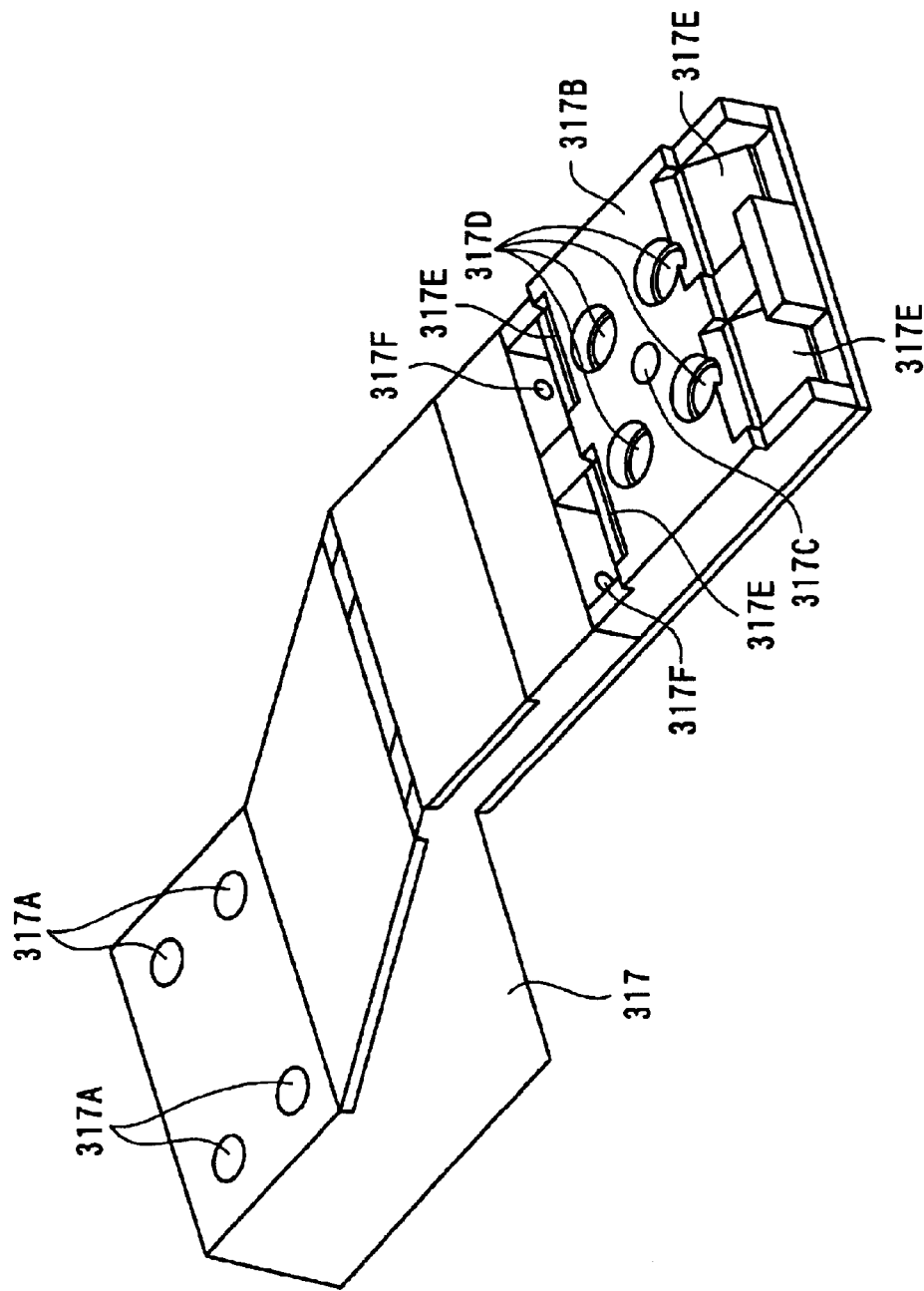
FIG. 12 is an overall perspective view showing a structure of a holder of the optical modulator of the aforesaid embodiment.

As shown in FIG. 12, the liquid crystal panel holder 317 is constructed by a metal plate of approximately Z-shaped side. A hole 317A for attachment to the second adjuster 315C is formed at the base end shown in upper left in the figure. An absorbing surface 317B for absorbing the image formation area of the liquid crystal panels 141R, 141G and 141B, an air-sucking absorbing hole 317C for formed approximately at the center of the absorbing surface 317B, and four light beam transmitting holes 317D penetrating the top and bottom surfaces of the holder 317 on the absorbing surface 317B are formed at the distal portion shown in lower right in the figure. Four mirrors 317E are disposed at 45 degrees angle relative to the absorbing surface 317B. Two holes 317F for irradiating ultraviolet are formed at a position corresponding to upper two mirrors 317E on the holder 317. Incidentally, the light beam transmitting holes 317D are formed at a position capable of introducing the light beam to four corners of the image formation area of the liquid crystal panels 141R, 141G and 141B to be held.

Figure 13:
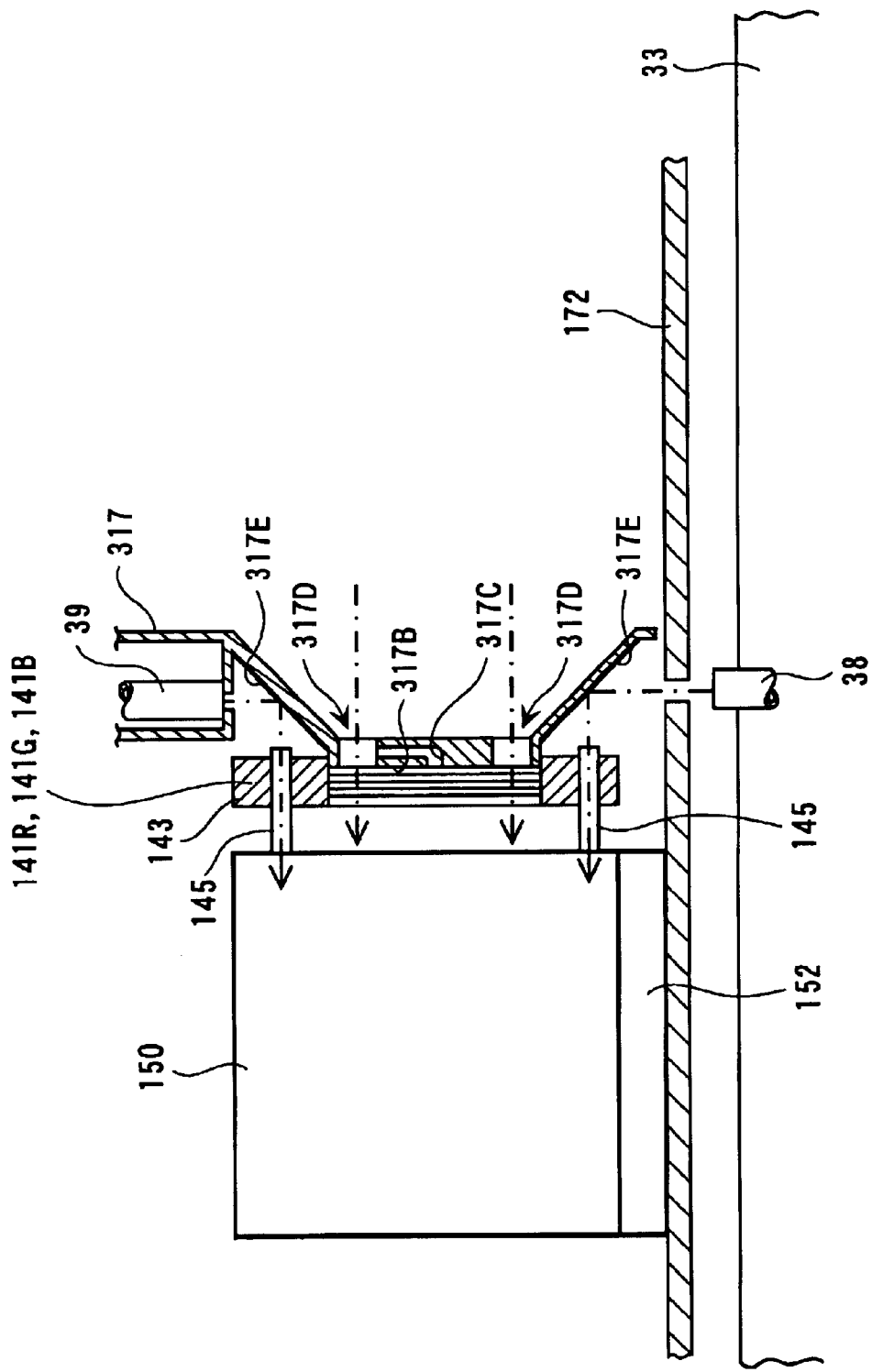
FIG. 13 is a vertical cross section showing a structure for attaching the optical modulator to the color combining optical system of the aforesaid embodiment.

As shown in FIG. 13, the liquid crystal panel holder 317 holds the liquid crystal panels 141R, 141G and 141B with the image formation area of the liquid crystal panels 141R, 141G and 141B being stuck thereon. Adjusting light beam irradiated by the light source unit 37 passing through the light guide along the illumination optical axis is transmitted through the light beam transmitting hole 317D to be incident on the image formation area of the liquid crystal panels 141R, 141 and 141B. Ultraviolet irradiated by an optical fiber 38 projecting from the lower side of the clamp jig 33 and an optical fiber 39 disposed on the inner surface of the liquid crystal panel holder 317 is incident on the mirror 317E. The ultraviolet reflected by the respective mirrors 317E is incident on the base end of the transparent pin 145 to cure the ultraviolet curing adhesive coated on the distal end of the pin and the inner side of the hole 143A formed on the holding frame 143 of the liquid crystal panels 141R, 141G and 141B.

Figure 14:
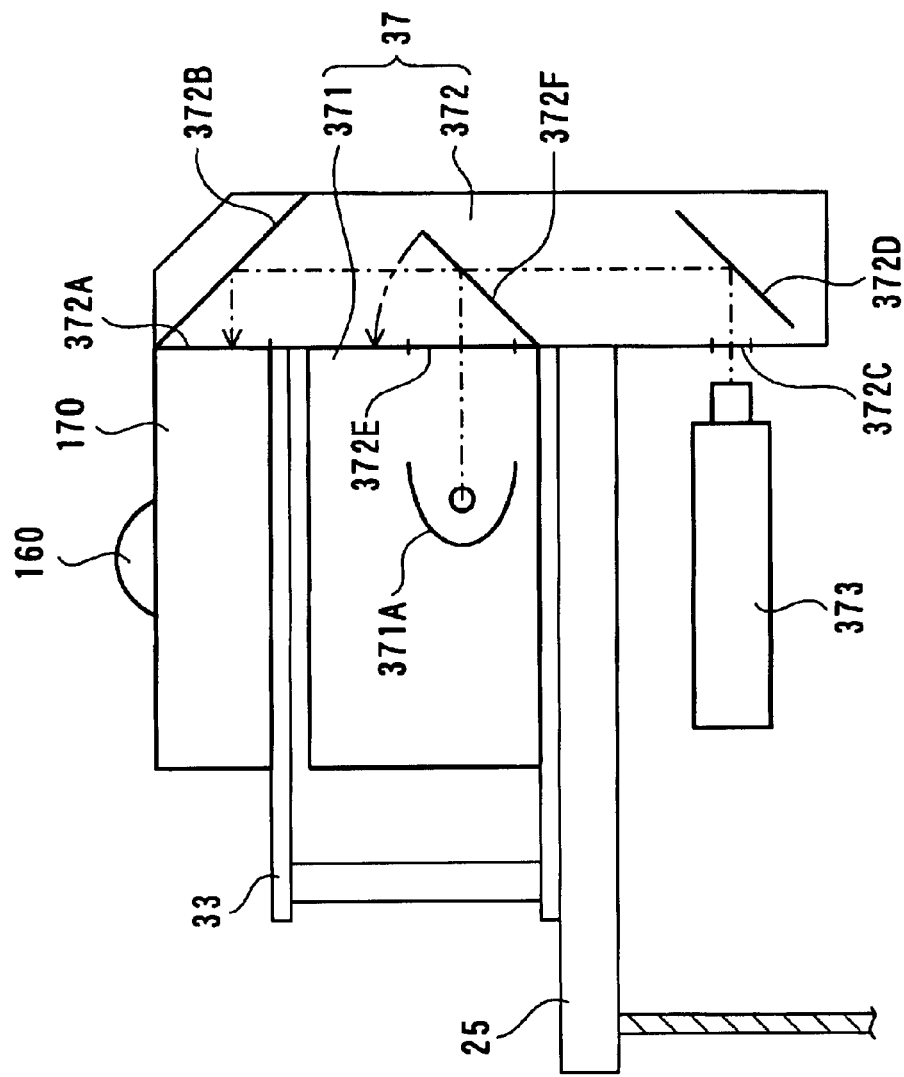
FIG. 14 is a schematic illustration representing adjusting light source and laser beam output of the aforesaid embodiment.

The light source unit 37 has a light source for adjusting position of the cross dichroic prism 50 and the liquid crystal panels 141R, 141G and 141B, which includes a light source body 371 and a light guide 372 as shown in FIG. 14.

The light source body 371 accommodates the light source lamp 371A as an adjusting light source in the casing thereof, the light source body supplying light beam to the optical unit 170. Though not shown, a cooling opening and a cooling fan located inside the opening are provided to the casing. Incidentally, the shutter of the light source lamp 371A is controlled by the below-described computer 70.

The light guide 372 is constructed by a vertically-extending cylindrical body. An opening 372A is formed on an upper end thereof and a mirror 372B is provided there-inside corresponding to the position of the opening 372A, the mirror 372B being disposed approximately at 45 degrees relative to the opening surface of the opening 372A.

The lower end of the light guide 372 extends to the lower part of the platform 25. An opening 372C is formed to a side of the lower end to oppose the laser beam irradiating portion of a laser beam output 373 disposed below the platform 25. A mirror 372D is disposed inside the light guide corresponding to the opening 372C approximately at 45 degrees relative to the opening surface of the opening 372C.

An opening 372E is formed on an intermediate part of the light guide at a position corresponding to the light beam irradiating portion of the light source lamp 371A of the light source body 371. A movable mirror 372F capable of adjustment within a range from 0 degree to 45 degrees relative to the opening surface of the opening 372E is disposed inside the light guide 372 corresponding to the opening 372E.

When the optical unit 170 is adjusted using the light source unit 37, the upper opening 372A of the light guide 372 and the opening for exchanging the light source lamp of the optical unit 170 are abutted to introduce the light beam irradiated by the light source lamp 371A of the light source body 371 and the laser beam output 373, thereby adjusting the position of the cross dichroic prism 150 and the liquid crystal panels 141R, 141G and 141B.

Specifically, when white laser beam is introduced into the optical unit 170, while the movable mirror 372F is moved to align with the opening 372E, i.e. to be 0 degree relative to the opening surface of the opening 372E, the white laser beam is irradiated by the laser beam output 373 so that the computer can recognize the position adjustment of the cross dichroic prism 150 and the optical axis position of the optical unit 170 itself. On the other hand, the adjusting light beam is irradiated from the light source lamp 371A of the light source body 371 while the movable mirror 372F is inclined at 45 degrees to adjust the focus and alignment of the liquid crystal panels 141R, 141G and 141lB.

Figure 15:
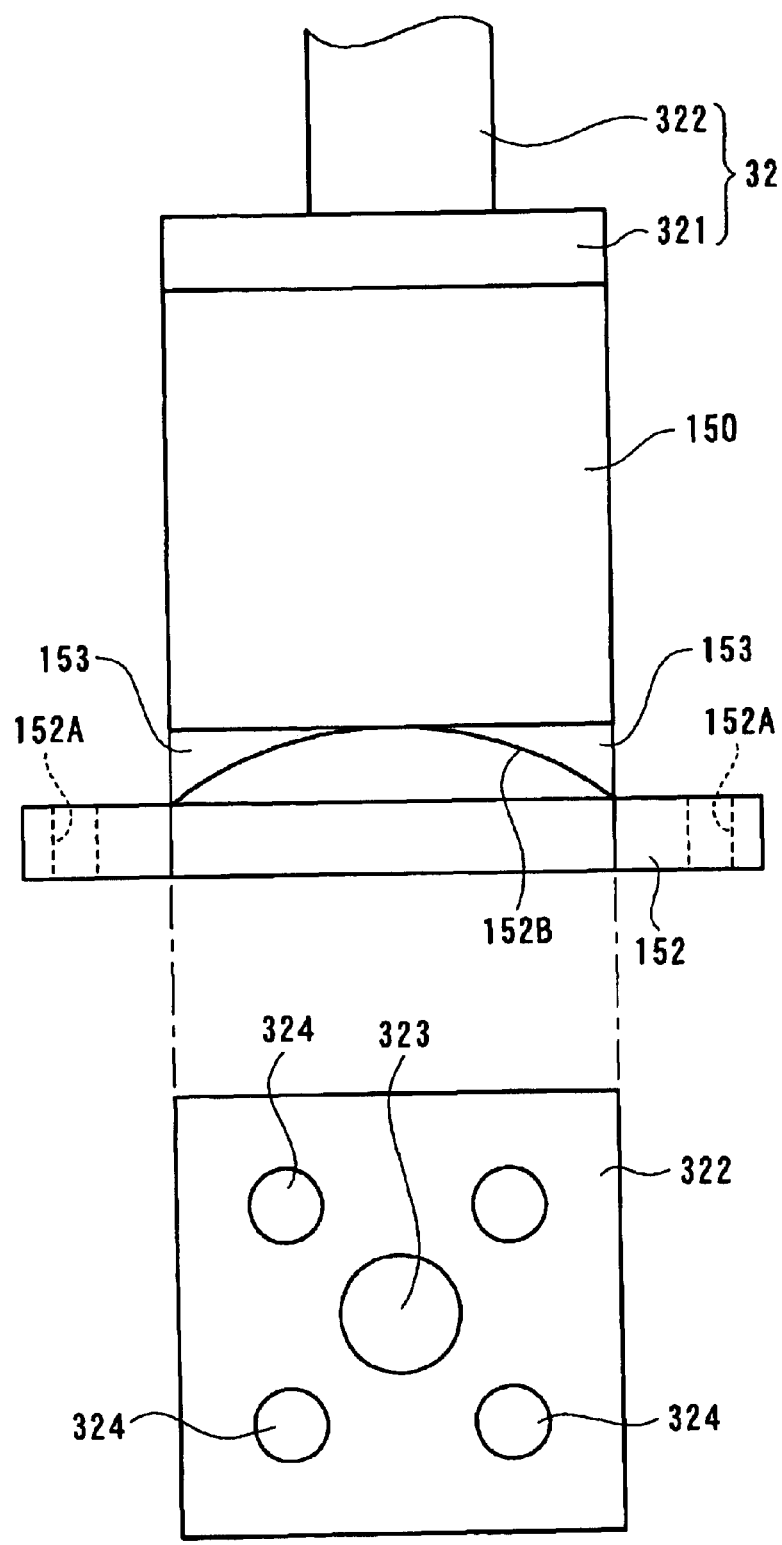
FIG. 15 is a side elevational view and a plan view showing a structure of the position adjusting apparatus of the color combining optical system of the aforesaid embodiment.

As shown in FIG. 15, the prism position adjusting unit 32 adjusts the position of the cross dichroic prism 150, which includes a prism holder 321 for sucking and holding the cross dichroic prism 150 and a drive shaft 322 with a distal end thereof being connected to the prism holder 321 and a base end thereof being connected to a drive mechanism (not shown).

The prism holder 321 has a planar configuration approximately the same as the planar configuration of the cross dichroic prism 150 to be held and sucks the upper side of the cross dichroic prism 150 to adjust the position of the cross dichroic prism 150. Accordingly, a sucking hole 323 is formed on an abutting surface of the prism holder 321 facing the cross dichroic prism 150.

An ultraviolet irradiator 324 is formed on the abutting surface. After completion of position adjustment by the prism position adjusting unit 32, ultraviolet is irradiated by the ultraviolet irradiator 324 to cure the ultraviolet curing adhesive 153 thereunder through the cross dichroic prism 150.

The drive shaft 322 is driven by a motor etc. to adjust the attitude of the prism holder 321 so that the cross dichroic prism 150 sucked by the prism holder 321 can be three-dimensionally freely located.

(3-2) Structure of Projector Body

In FIG. 9, the screen unit 50 and the reflecting device 60 constituting the projector body 40 are mutually opposed inside the darkroom 20B.

The screen unit 50 is located on the side of the six-axis position adjusting unit 31 of the darkroom 20B, which includes a transmissive screen 53 as a projection surface of the to-be-adjusted optical unit 170 disposed on an upper side of the bottom plate 27 of the darkroom 20B, a CCD camera 55 disposed on the backside of the transmissive screen 53 constituting the detecting device of the position adjusting device of the optical modulator, a CCD camera 56 disposed approximately at the center of the transmissive screen 53 to be a light sensor, and a moving mechanism 57 for moving the CCD cameras 55 and 56 along the surface of the transmissive screen 53. A transmissive window 53A for transmitting the light irradiated from the light source unit 37 through the optical unit 170 is provided to the transmissive screen 53. A position sensor 58 for detecting the white laser light outputted from the laser beam output 373 is provided at a lower center of the mirror 63.

Figure 16:
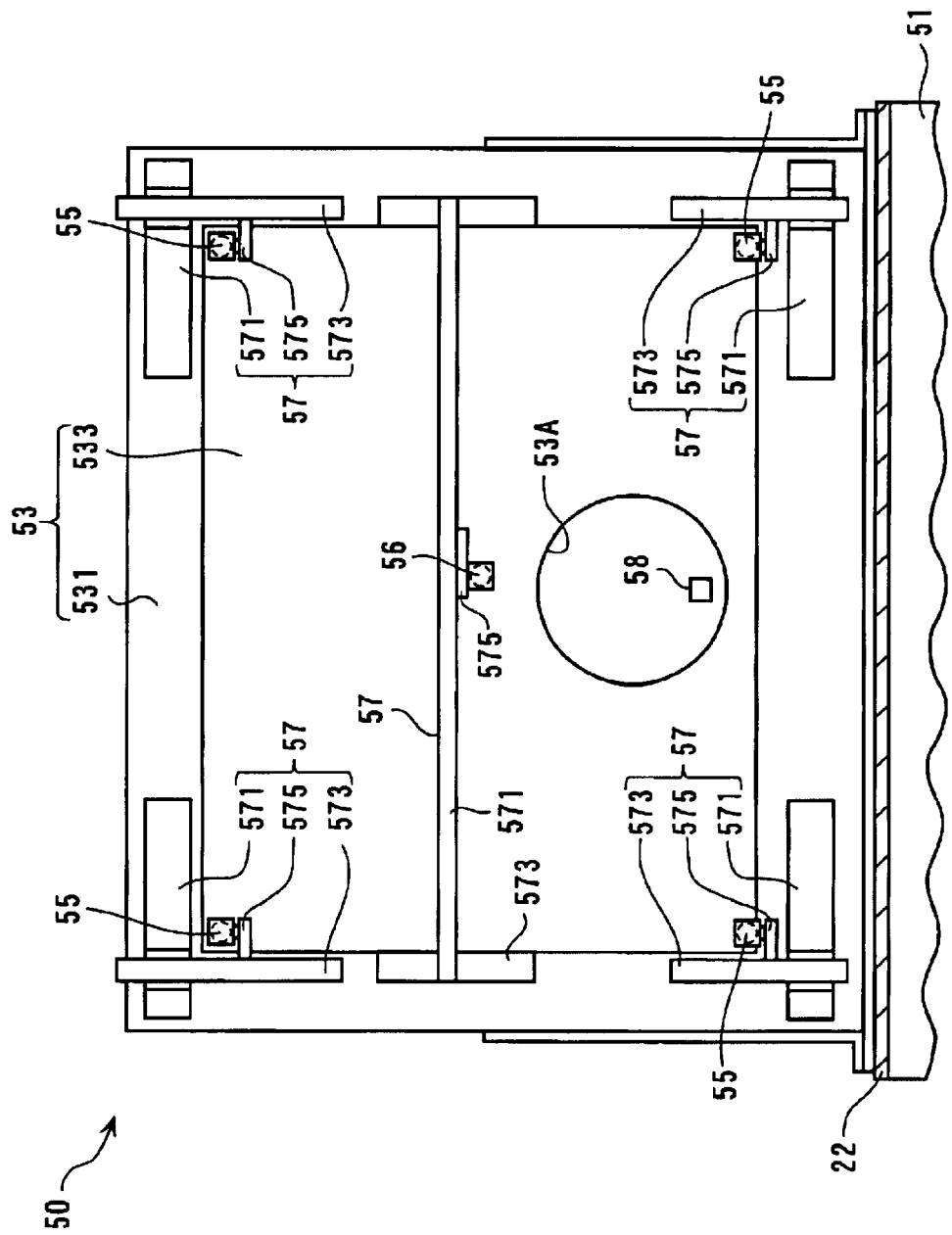
FIG. 16 is a front elevational view showing a screen on which a projection image is projected, a detecting device and an optical axis sensor of the aforesaid embodiment.

As shown in FIG. 16, the transmissive screen 53 has a rectangular frame body 531 provided on the periphery thereof and a screen body 533 provided inside the frame body 531. The screen body 533 can be constructed by uniformly dispersing optical beads on non-light-transmissive resin layer. When light beam is incident from the side disposed with the optical beads, the optical beads work as a lens to irradiate the light to the backside of the screen body 533.

Both of the CCD camera 55 as a detecting device and a CCD camera 56 as a light sensor are area sensors having charge coupled device as an image sensor, which detects the projected image formed on the backside of the screen body 533 to output as an electric signal.

The CCD cameras 55 and 56 are attached around the four corners of the rectangular projected image displayed on the transmissive screen 53. The CCD camera 55 is located around the four corners of the projected image and the CCD camera 56 is located approximately at the center of the projected image. Incidentally, the CCD cameras 55 and 56 have zoom-focus mechanism for detecting the projected image with high accuracy, so that the zoom-focus can be freely adjusted by remote control.

A position sensor 58 as the point sensor is a device for measuring two-dimensional position of light spot of the white laser beam etc., the sensor including a semiconductor position sensing element and using a photodiode as the sensing element.

The moving mechanism 57 has a horizontal portion 571 extending in horizontal direction of the frame body 531, a vertical portion 573 extending in vertical direction and a camera attachment 575 to which the CCD cameras 55 and 56 are attached.

The CCD camera 55 can be freely moved along the transmissive screen 53 by the horizontal slide movement of the vertical portion 573 relative to the horizontal portion 571.

On the other hand, the CCD camera 56 can be freely moved along the transmissive screen 53 by the vertical slide movement of the horizontal portion 571 relative to the vertical portion 573 and consequent horizontal slide movement of the camera attachment 575 relative to the horizontal portion 571.

Further, in the below-described prism position adjustment, the white laser beam is detected by the position sensor 58 and the white laser beam is detected by the position sensor 58 in determining the optical axis position of the optical unit 170. Incidentally, the position sensor 58 is used in adjusting the prism in order to follow and sense the position of the light spot by the white laser beam greatly displaced in adjusting the position of the cross dichroic prism 150.

The CCD cameras 55 and 56 and the position sensor 58 can be moved by a servo-control mechanism inside the platform 51 by remote control.

In FIGS. 9 and 10, the reflecting device 60 reflects the light projected from the light source unit 37 through the projection lens 160, which includes a reflector body 61 opposed against the projection lens 160, and a reflector moving mechanism 62 for moving the reflector body 61 toward and away from the projection lens 160.

The reflector body 61 has a mirror 63 disposed on the same plane corresponding to the position of the irradiated projection light, an attachment plate 64 for the mirror 63 to be attached and a support plate 65 for supporting the lower part of the attachment plate 64. The mirror 63 is formed so that a reflection surface 63A thereof becomes orthogonal with the optical axis of the projection light irradiated from the projection lens 160.

The reflector moving mechanism 62 has a plurality of rails 66 extending on the bottom plate 22 of the darkroom 20B in a direction orthogonal with the plane of the transmissive screen 53, a wheel 67 rotatably movable on the rail 66 and provided to the support plate 65, and a drive mechanism (not shown) for rotatably driving the wheel 67.

(3-3) Control Structure of Position Adjusting System

Figure 17:
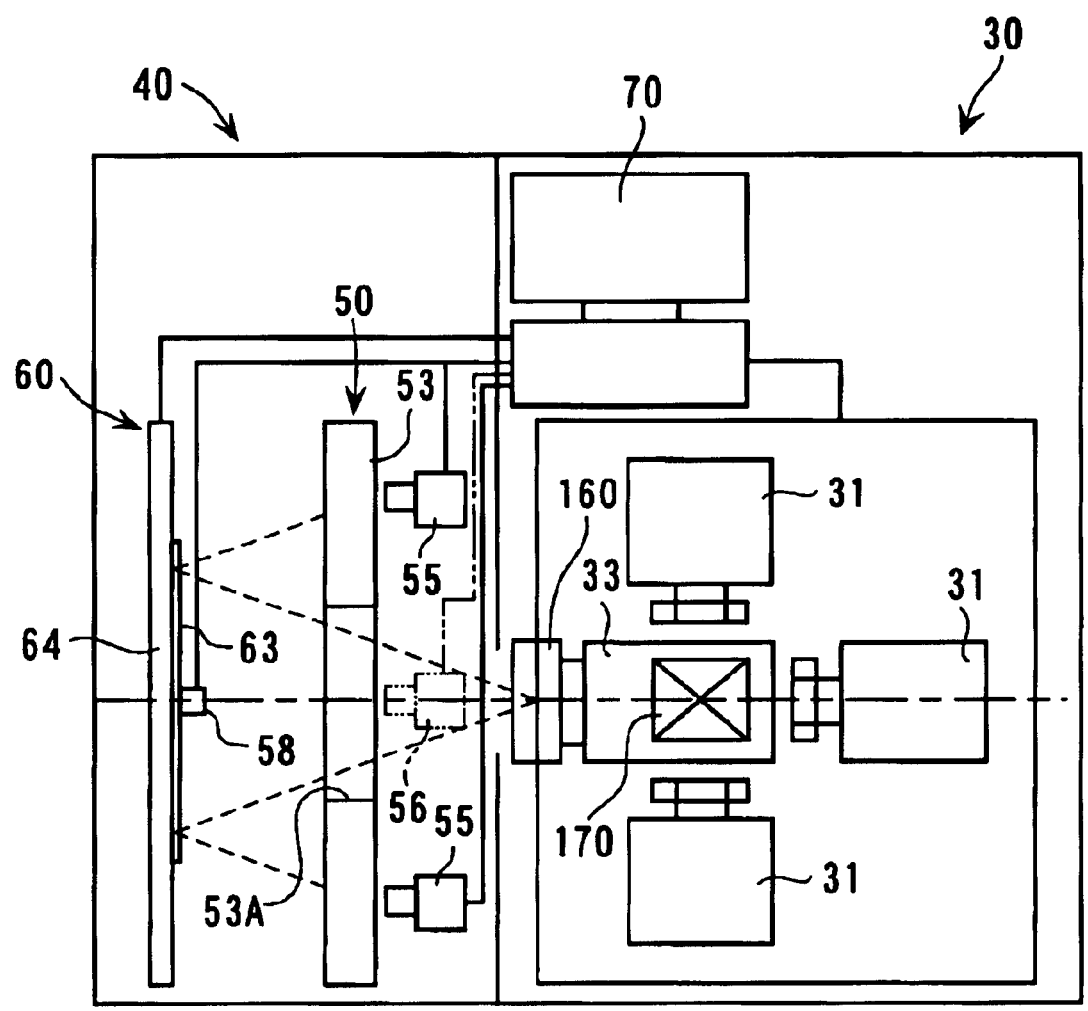
FIG. 17 is a block diagram showing a control structure of the system of the aforesaid embodiment.

The above-described adjuster body 30, the screen unit 50 and the reflecting device 60 are electrically conducted to the computer as a controller as shown in block diagram of FIG. 17.

The computer 70 has a CPU and a storage for controlling the operation of the servo mechanism of the adjuster body 30, the screen unit 50 and the reflecting device 60 and is connected with the CCD cameras 55 and 56 and the position sensor 58 through the image importing device such as a video capture board.

The projection image taken by the CCD camera 55 is inputted to the computer 70 through the image importing device, which is converted to an image signal adapted to the computer, and, subsequently, is processed by an image processing software executed on an OS for controlling the operation of the computer 70 including the CPU, thereby conducting focus and alignment adjustment of the liquid crystal panels 141R, 141G and 141B.

In the same manner, the projection image taken by the CCD camera 56 is processed by a prism position adjusting program and an optical axis calculation program executed on the OS, thereby conducting position adjustment of the cross dichroic prism 150 and calculation of optical axis of the optical unit 170.

The position of the light spot detected by the position sensor 58 is imported to the computer 70 to be processed.

[4. Position Adjustment Operation of Prism and Liquid Crystal Panel by Position Adjusting System]

Figure 18:
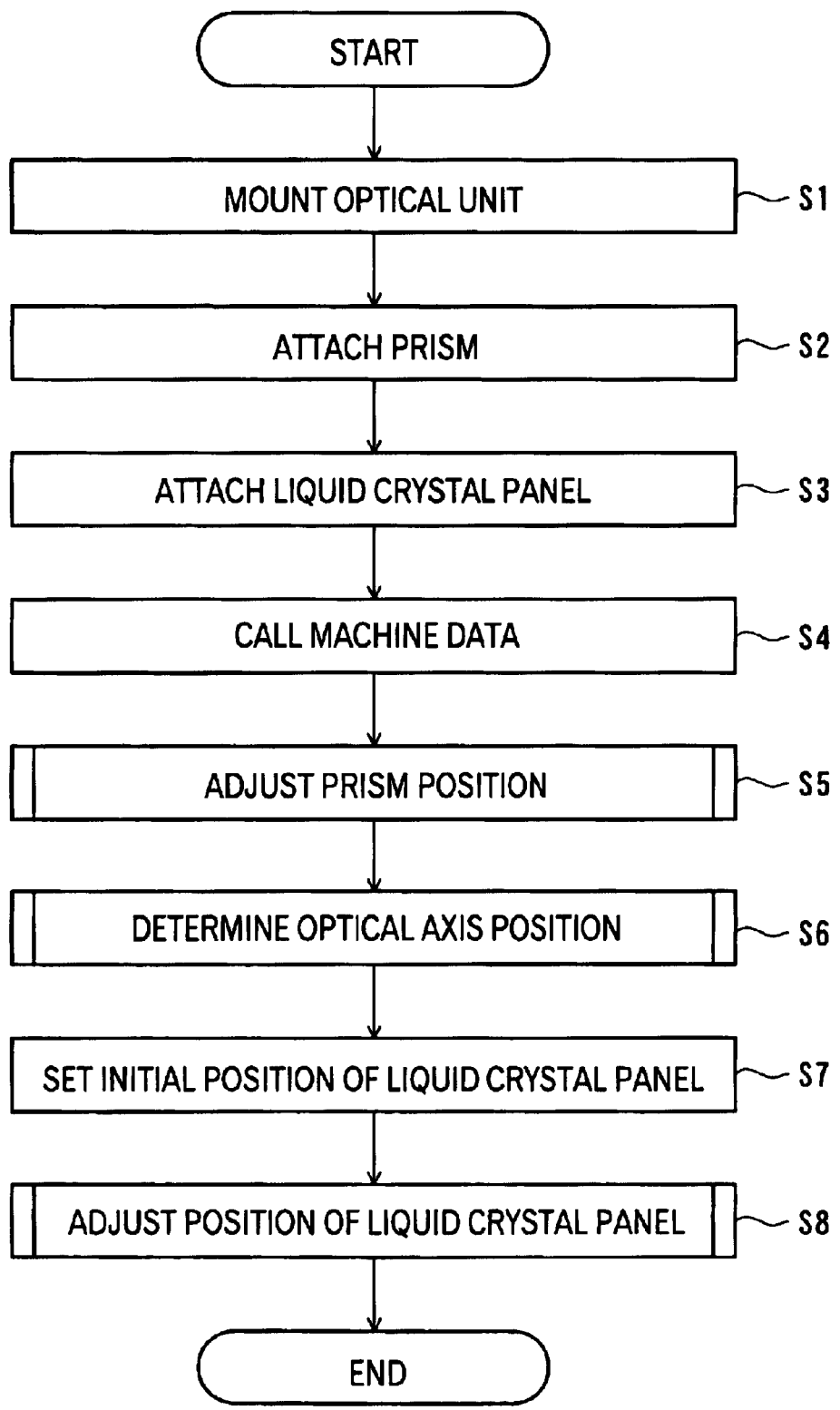
FIG. 18 is a flowchart showing a process of position adjustment of the aforesaid embodiment.

In the position adjusting system 2 of the modulator, the optical unit 170 is adjusted according to flowchart shown in FIG. 18.

(1) Initially, the upper light guide 171 mounted with the various optical components shown in FIG. 4 and the lower light guide 172 shown in FIG. 8 are combined to construct the optical unit 170 to be adjusted, which is set to the clamp jig 33 of the adjuster body 30 (step S1). At this time, only the fixing plate 152 is fixed to the lower light guide 172 by the screw 154 and the ultraviolet curing adhesive 153 is coated on the mounting surface of the cross dichroic prism 150 in a non-cured manner.

(2) Next, the cross dichroic prism 150 is attached to the prism position adjusting unit 32 (step S2) and the liquid crystal panels 141R, 141G and 141B are attached to the six-axis position adjusting unit 31 (step S3). Incidentally, the liquid crystal panels 141R, 141G and 141B are attached by inserting the pin 145 coated with the ultraviolet curing adhesive into the hole 143A formed on the four corners of the holding frame 143 shown in FIG. 5 while the adhesive is non-cured.

(3) The computer is operated to call the machine data stored in the storage for every projector type, which is loaded on the memory of CPU (step S4). The machine data includes the designed disposition of the cross dichroic prism 150, the liquid crystal panels 141R, 141G and 141B. The designed disposition is set as an initial position in adjusting the respective positions.

Figure 19:
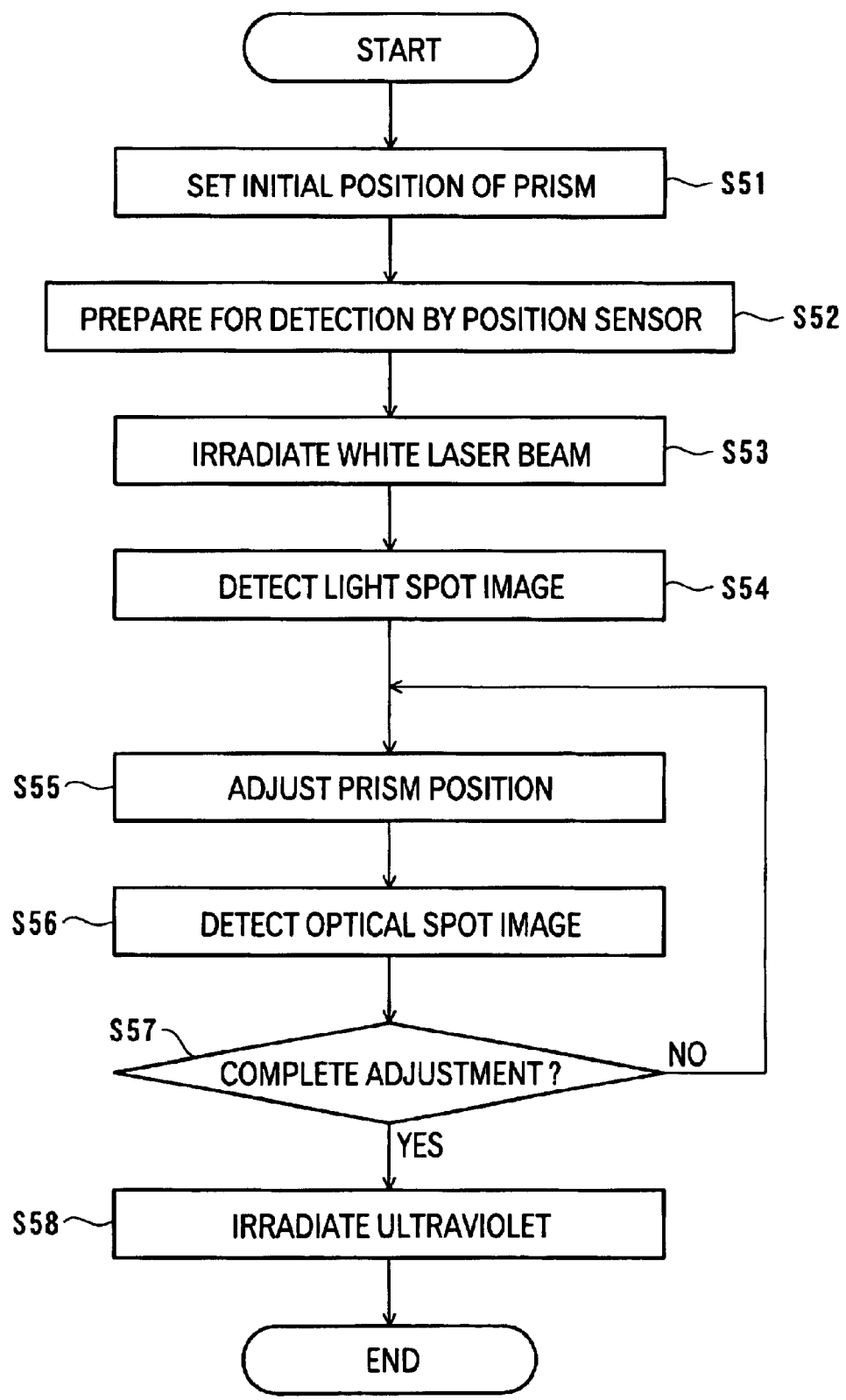
FIG. 19 is a flowchart showing a process of prism position adjustment of the aforesaid embodiment.

(4) After completion of adjustment preparation, the prism position is adjusted (step S5), which is, specifically, conducted according to a flowchart shown in FIG. 19.

(4-1) The CPU of the computer 70 outputs a control command to the prism position adjusting unit 32 based on the designed position of the cross dichroic prism 150 of machine data loaded on the memory. The prism position adjusting unit 32 sets the cross dichroic prism 150 at the initial position based on the control command (step S51). Incidentally, the CPU also outputs the control command to the six-axis position adjusting unit 31 to shelter the attached liquid crystal panels 141R, 141G and 141B to a position without interfering the white laser beam for adjusting the cross dichroic prism 150.

(4-2) The CPU of the computer 70 moves the position sensor 58 substantially at the center of the projection image projected on the transmissive screen 53 to prepare for detection by the position sensor 58 (step S52). The CPU also moves the movable mirror 372F of the light source unit 37 to irradiate the white laser beam from the laser beam output 373 (step S53: laser beam irradiation step).

(4-3) The white laser beam irradiated by the light source unit 37 is separated into three color lights of RGB within the optical unit 170 and is subsequently combined by the cross dichroic prism 50 to create a light spot image on the transmissive screen 53. The position sensor 58 detects the light spot image of all of the respective lights (step S54).

(4-4) The light spot image detected by the position sensor 58 is imported into the computer 70 as a numeric signal. The CPU of the computer 70 outputs a control command to the prism position adjusting unit 32 based on the imported numeric signal to adjust the position of the cross dichroic prism 150 (step S55: position adjusting step) and again detects the light spot image after adjustment (step S56: combined light detecting step).

Figure 20:
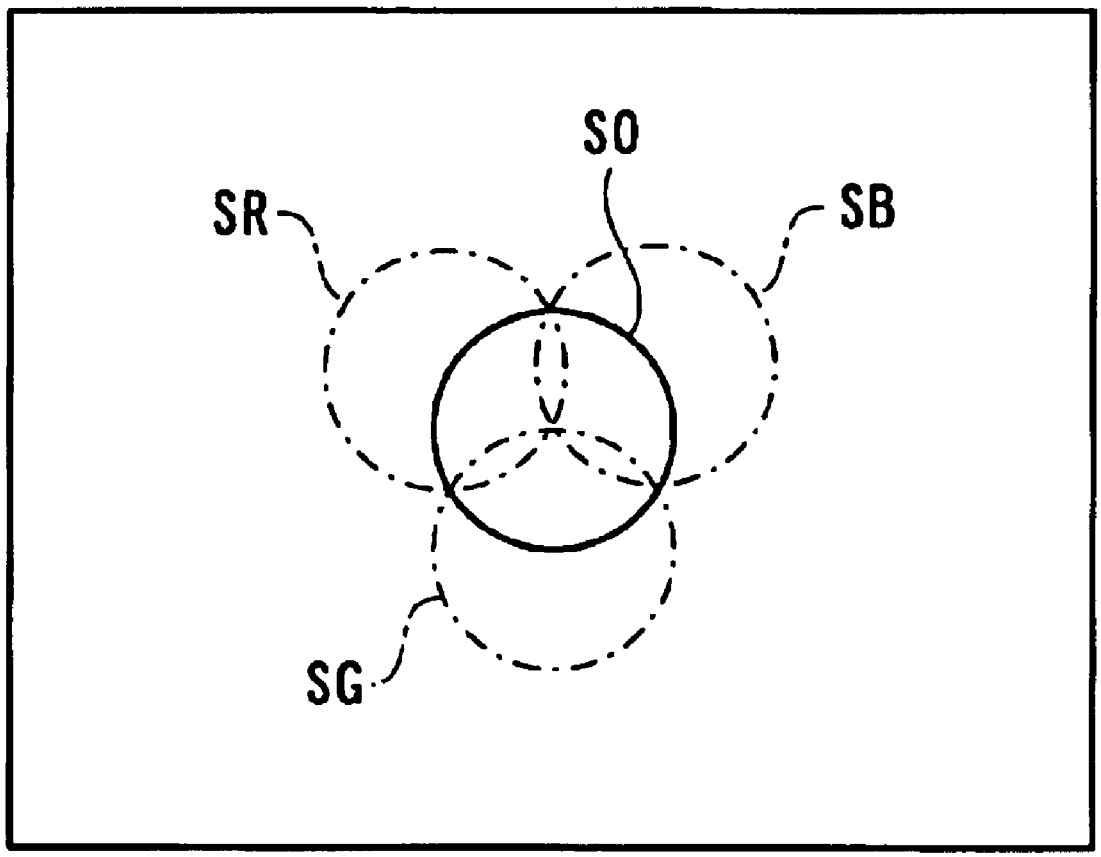
FIG. 20 is a schematic illustration showing a standard for determining completion of adjustment of prism position according to the aforesaid embodiment.

(4-5) The CPU of the computer 70 calculates the area of the light spot image by the image processing program while conducting prism position adjustment and determines whether the adjustment is terminated or not based on the calculated area (step S57: adjustment termination determining step). Specifically, when the cross dichroic prism 150 is at a position shifted relative to the illumination optical axis, the light spot images SR, SG and SB of the respective color lights of separated RGB are shifted as shown in FIG. 20, so that the sum of the area of the light spot images SR, SG and SB becomes greater than the area of the light spot image SO of the original white laser beam. Accordingly, the adjustment termination is determined when the sum of the area of the light spot images SR, SG and SB becomes equal to the area of the light spot image SO of the original white laser beam.

(4-6) After completing position adjustment of the cross dichroic prism 150, the CPU outputs a control command to the prism position adjusting unit 32, based on which the prism position adjusting unit 32 irradiates ultraviolet from the ultraviolet irradiator 324 of the prism holder 321 to cure the ultraviolet curing adhesive 153 on the fixing plate 152 (step S58: adhesive curing step) to complete position adjustment of the cross dichroic prism 150.

Figure 21:
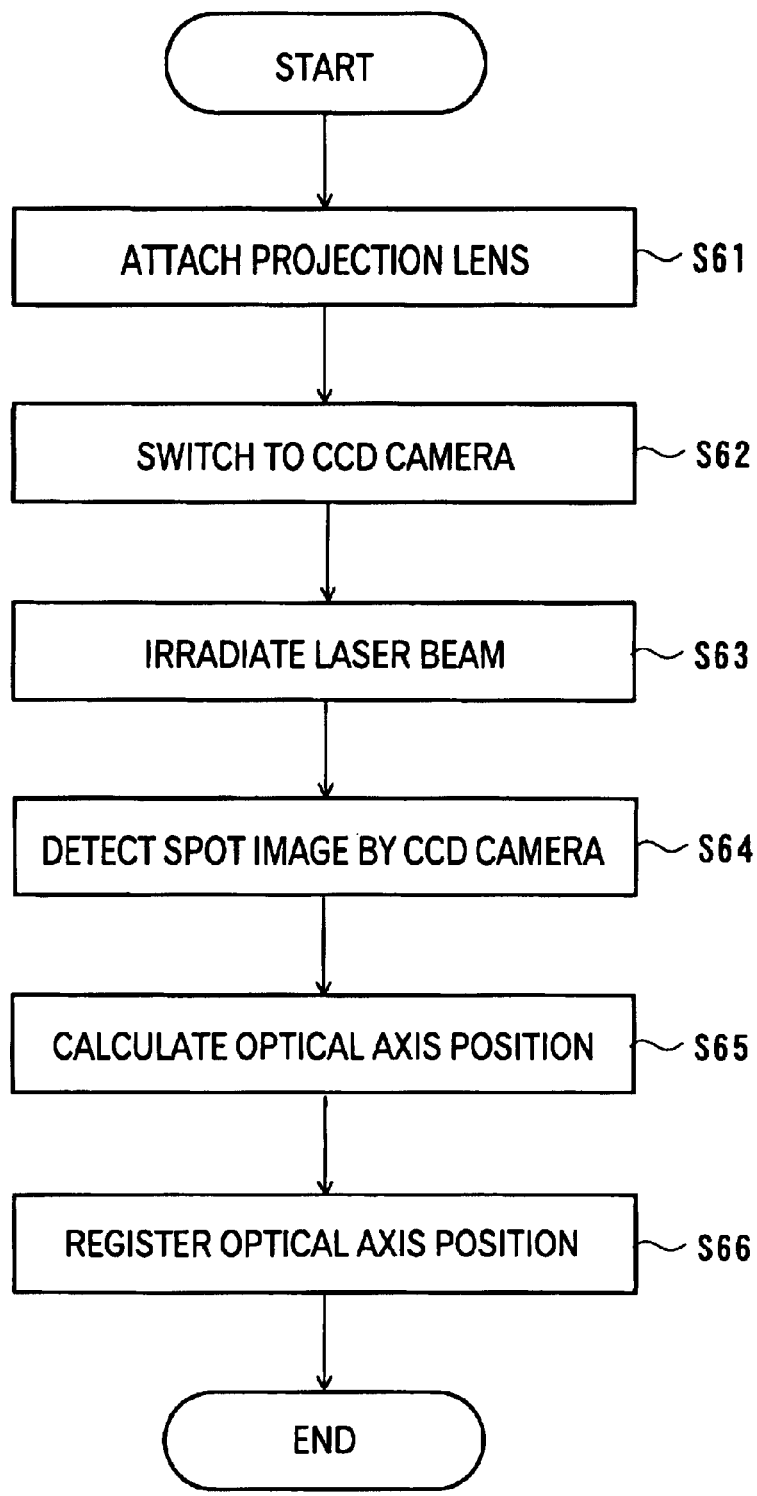
FIG. 21 is a flowchart showing a process for determining optical axis of the light modulator according to the aforesaid embodiment.

(5) After the prism position adjusting step is completed and the position of the cross dichroic prism 150 is determined, the optical axis determination of the optical unit 170 is started (step S56), which is specifically conducted according to the flowchart shown in FIG. 21.

(5-1) Initially, a projection lens 160 having average optical characteristics are attached to the optical unit 170 as a master lens (step S61).

(5-2) Next, the CPU of the computer 70 outputs a control signal to the moving mechanism 57 to switch the position sensor 58 to the CCD camera 56 to prepare for detection by the CCD camera 56 (step S62).

(5-3) The CPU of the computer 70 outputs a control signal to the laser output 373 to irradiate the white laser beam to project a spot image on the transmissive screen 53 through the projection lens 160 (step S63: laser beam irradiating step) and detects the spot image projected on the transmissive screen 53 by the center CCD camera 56 (step S64: laser beam detecting step), which is outputted to the computer 70 as a numeric signal.

(5-4) The CPU of the computer 70 calculates the optical axis position based on the laser spot centroid position on the center CCD camera 56 (step S65: optical axis position calculating step) and stores the optical axis position of the optical unit 170 on the memory (step S66).

(6) After recognizing the optical axis position of the optical unit 170, the CPU of the computer 70 generates a control command based on the designed position of the liquid crystal panels 141R, 141G and 141B contained in the machine data to output to the six-axis position adjusting unit 31. The six-axis position adjusting unit 31 moves the liquid crystal panels 141R, 141G and 141B to set the pin 145 to an initial position where the pin 145 abuts to the light-incident end surface 151 of the cross dichroic prism 150 (step S7).

Figure 22:
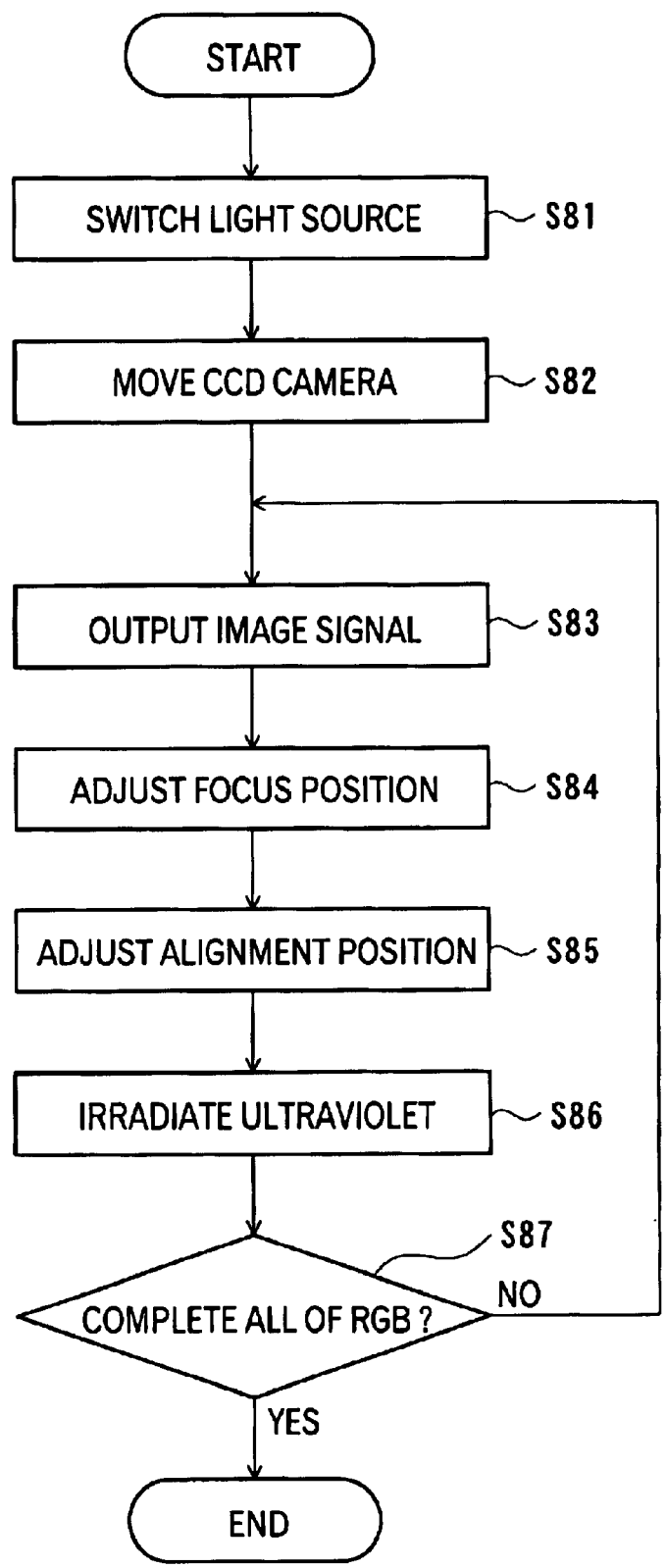
FIG. 22 is a flowchart showing a process for adjusting position of the optical modulator according to the aforesaid embodiment.

(7) After terminating optical axis position setting, the position of the liquid crystal panels 141R, 141G and 141B relative to the cross dichroic prism 150 is adjusted (step S8), which is specifically conducted based on a flowchart shown in FIG. 22.

(7-1) The CPU of the computer 70 outputs a control command to the light source unit 37 to move the movable mirror 372F of the light source unit 37 and switches the white laser beam to the light source lamp 371A of the light source body 371 (step S81) to light the light source lamp 371A (shutter open). The light beam irradiated by the light source lamp 371A is supplied to the inside of the optical unit 170 through the light guide 372 and is incident on the liquid crystal panels 141R, 141G and 141B through the light beam transmission hole 317D of the liquid crystal panel holder 317 to form the projection image on the four corners of the transmissive screen 53 through the projection lens 160.

(7-2) The CPU of the computer 70 moves the corner-located four CCD cameras 55 to is four corners relative to the optical axis position of the optical unit 170 recognized during the optical axis position determining step, thereby detecting the projection image by the respective CCD cameras 55 (step S82).

(7-3) In the above state, the CPU of the computer 70 outputs the image signal including the image pattern for adjusting alignment only onto the liquid crystal panel to be adjusted, and outputs image signal for displaying black image to the other liquid crystal panel (step S83). Since the position of the liquid crystal panels 141R and 141B is adjusted after adjusting the position of the liquid crystal panel 141G, different image signals are sequentially outputted accordingly. Incidentally, in adjusting the position of the liquid crystal panels 141R, 141G and 141B, a three-CCD camera may be used as the CCD camera 55 for simultaneously adjusting the position of the three liquid crystal panels 141R, 141G and 141B, thereby greatly enhancing the adjustment speed.

(7-4) The CPU of the computer 70 adjusts the focus of the liquid crystal panel 141G so that the optical axis position obtained in the preceding step of S7 is not moved and, after completion of focus adjustment, the alignment is adjusted using the image pattern (steps S84, S85: position adjusting step).

(7-5) After completion of position adjustment of the liquid crystal panels 141G, ultraviolet is irradiated from the optical fibers 38 and 39 to cure the ultraviolet curing adhesive on the distal end of the pin 145 (step S86) and outputs an image signal to start adjusting the next liquid crystal panel 141R. The above-described steps are repeated until the position of all of the liquid crystal panels 141R, 141G and 141B is adjusted (step S87).

[5. Effects of Embodiment]

According to the above-described embodiment, following effects can be obtained.

In adjusting the position of the cross dichroic prism 150 to be the color-combining optical system, the white laser beam is separated into three color lights by the color-separating optical system 120 to be incident on the light-incident end surface 151 of the cross dichroic prism 150 by implementing the laser beam irradiating step S53, the combined light detecting step S56 and the position adjusting step S55 and the position of the cross dichroic prism 150 can be adjusted while detecting the combined light beam by the position sensor 58, so that the position of the cross dichroic prism 150 relative to the optical unit 170 can be determined with high accuracy.

Further, since the adjustment termination determining step S57 is provided, the position adjustment of the cross dichroic prism 150 can be automatically determined by the computer 70, so that the cross dichroic prism 150 can be more speedily and simply adjusted.

Further, since the completion of the position adjustment is determined when the sum of the area of the light spots SR, SG and SB becomes the minimum, the position of the cross dichroic prism 150 relative to the optical unit 170 can be adjusted at the most appropriate position, thereby conducting position adjustment with a simple and highly accurate judging process.

Since the position adjusting step S55 is conducted while the ultraviolet curing adhesive 153 is non-cured, the position of the cross dichroic prism 150 can be freely adjusted. Further, since the adhesive curing step S58 is conducted after determining completion of adjustment, the position of the cross dichroic prism 150 relative to the optical unit 170 can be determined at the most suitable position.

Since the spherical bulging portion 152B is formed on the fixing plate 152, the cross dichroic prism 150 and the bulging portion 152B contact at a point, so that the position of the cross dichroic prism 150 can be three-dimensionally adjusted using the prism position adjusting unit 32 even when the cutting accuracy of the cross dichroic prism 150 is inferior, so that the position of the external side and the vapor evaporation surface formed in approximate X-shape can be appropriately adjusted. Further, in the same manner, the position of the cross dichroic prism 150 can be appropriately adjusted without being influenced by the surface roughness of the cross dichroic prism 150.

Since the ultraviolet curing adhesive 153 is filled so that the gap between the lower surface of the cross dichroic prism 150 and the fixing plate 152 is buried, the lower side of the cross dichroic prism 150 can be supported not only by the point-contact of the bulging portion 152B of the fixing plate 152 but also by the filled ultraviolet curing adhesive 153, thereby stably fixing the cross dichroic prism 150 and the fixing plate 152 fixed during the position adjusting step S5.

Since the height h of the bulging portion 152B is set as ½*A where A represents maximum tolerance of cutting accuracy of the cross dichroic prism 150, the bulging portion 152B of the fixing plate 152 is in point-contact with the lower side of the cross dichroic prism 150, thereby appropriately adjusting the position of the cross dichroic prism 150 with appropriate amount of the ultraviolet curing adhesive 153. Since the curvature radius R of the bulging portion 152B is set so that the area Sb of the bulging portion 152B is ½*Sa where Sa represents the area of the bonding surface of the cross dichroic prism 150 against the fixing plate 152, the bulging portion 152B of the fixing plate 152 can support the center of the lower side of the dichroic prism 150, thereby stably fixing the cross dichroic prism 150. Further, since the curvature radius is employed, the strength of the bulging portion 152B relative to the fixing plate 152 can be maintained.

On the other hand, since the laser beam output 373 and the CCD camera 56 as an optical axis sensor is provided, the position of the liquid crystal panels 141R, 141G and 141B can be adjusted while checking the illumination optical axis of the optical unit 170, the relative position of the respective liquid crystal panels 141R, 141G and 141B can be adjusted after adjusting the position of the liquid crystal panels 141R, 141G and 141B relative to the optical component casing composed of the upper light guide 171 and the lower light guide 172. Accordingly, small projector of small illumination margin can be produced with high yielding rate.

Further, since the adjuster body 30 has the light source unit 37 for supplying the adjusting light beam and the liquid crystal panel holder 317 having the light beam transmitting hole 317D, the position of the liquid crystal panels 141R, 141G and 141B can be adjusted with the light beam irradiated by the optical unit 170 similar to actual light, so that the position of the liquid crystal panels 141R, 141B and 141G can be adjusted with high accuracy considering disposition accuracy of the optical components within the optical component casing. In addition, since the adjusting light beam can be introduced to the image formation area of the liquid crystal panels 141R, 141G and 141B only by forming the light beam transmitting hole 317D on the liquid crystal panel holder 317, the position adjusting system 2 of optical modulator capable of highly accurate position adjustment can be constructed with a simple structure.

Further, since the ultraviolet irradiating portion for irradiating ultraviolet composed of the hole 317F and the mirror 317E, the liquid crystal panels 141R, 141G and 141B can be fixed by curing the ultraviolet curing adhesive coated on the distal end of the pin 145 by irradiating ultraviolet immediately after completion of position adjustment of the liquid crystal panels 141R, 141G and 141B, so that the position adjustment and position fixing can be speedily conducted, thereby efficiently producing the projector.

[6. Modification of Embodiment]

Incidentally, the scope of the present invention is not restricted to the above-described embodiments but includes the following modifications.

Though the optical axis position determining step S7 is conducted after adjusting the position of the cross dichroic prism 150 in the above-described embodiment, the arrangement is not limited thereto. Specifically, ordinary position adjusting step may be conducted after position adjustment and position determination of the cross dichroic prism.

Though the position of the cross dichroic prism 150 is automatically adjusted using the computer 70 in the above-described embodiment, the position adjustment may be manually conducted.

Though the optical unit 170 of projector for modulating light by the liquid crystal panels 141R, 141G and 141B is adjusted in the above-described embodiment, the present invention may be applied for adjusting position of optical modulator other than the liquid crystal panels such as a device using micro-mirrors. In other words, the present invention can be applied to any projector having a plurality of optical modulators where the light beam modulated by the respective optical modulators has to be combined by a color combining optical system.

Though the completion of position adjustment of the cross dichroic prism 150 is determined when the area of the light spot becomes the smallest in the above-described embodiment, the arrangement is not limited. Specifically, a CCD camera may be used instead of the point sensor and the completion of adjustment may be determined when the white area of light spot becomes the smallest.

On the other hand, though the prism position adjusting unit 32 is installed in the position adjusting system 2 of optical modulator in the above-described embodiment, the arrangement is not limited. Specifically, after the cross dichroic prism is adhered and fixed on the fixing plate in advance, the cross dichroic prism may be fixed on the lower light guide to adjust the position of the liquid crystal panel.

Though the position of the liquid crystal panels 141R, 141G and 141B is adjusted in the order of 141G, 141R and 141B in the above-described embodiment, the position of the three liquid crystal panels may be simultaneously adjusted.

Though enlarged projection image is detected by the CCD camera 55 through the projection lens 160 to be adjusted, the arrangement is not limited. Specifically, the optical axis position and alignment of the optical modulator may be adjusted without passing through the projection lens.

The other arrangement and configuration in implementing the present invention may be used as long as an object of the present invention can be attained.

What is claimed is:

1. A position adjusting method of color combining optical system used for producing a projector including a light source, a color separating optical system that separates a light beam irradiated by the light source into a plurality of color lights, an optical component casing that accommodates optical components constituting the color separating optical system, a plurality of optical modulators that modulate the respective color lights separated by the color separating optical system in accordance with image information, and a color combining optical system that combines the light beam modulated by the respective optical modulators to form an optical image, the position adjusting method adjusting the position of the color combining optical system relative to the optical components casing, comprising the steps of:

irradiating a white laser beam on an optical axis of a light beam passing through the optical component casing;

separating the white laser beam by the color separating optical system into the respective color lights to be incident on a light-incident end surface of the color combining optical system and detecting the light beam combined by the color combining optical system by a sensor; and three-dimensionally adjusting the position of the color combining optical system relative to the optical component casing while detecting the combined light.

2. The position adjusting method of color combining optical system according to claim 1, wherein the sensor is a point sensor, and wherein the completion of the position adjustment is determined while monitoring detection status in the combined light detecting step.

3. The position adjusting method of color combining optical system according to claim 2, wherein the completion of adjustment is determined when the area of the combined light detected by the point sensor becomes the minimum.

4. The position adjusting method of color combining optical system according to claim 1, wherein the color combining optical system includes a prism that combines the color lights and a fixing plate adhered on the lower side of the prism by a light curing adhesive to be mechanically fixed to the optical component casing, wherein the position adjusting step is conducted while the light curing adhesive is not cured, wherein the completion of the position adjustment is determined while monitoring detection status in the combined light detecting step, and wherein light is irradiated to the light curing adhesive to cure the adhesive after determining the adjustment completion.

5. The position adjusting method of color combining optical system according to claim 4, wherein the fixing plate has a spherical bulging portion formed on a fixing surface of the prism, and wherein the position of the prism is three-dimensionally adjusted to the fixing plate while the adhesive is not cured and the prism is in contact with the bulging portion.

6. The position adjusting method of color combining optical system according to claim 5, wherein the light curing adhesive is coated so that the gap between the lower side of the prism and the fixing plate formed by the bulging portion of the fixing plate is filled.

7. The position adjusting method of color combining optical system according to claim 5, wherein the height of the bulging portion of the fixing plate is from 50 to 100% of maximum tolerance of cutting accuracy on the lower side of the prism, and wherein the curvature radius of the bulging portion is set so that the area of the bulging portion is from 1 to 50% of the area of the lower side of the prism.

8. A position adjusting system used for producing a projector having a light source, a color separating optical system for separating a light beam irradiated by the light source into a plurality of color lights, an optical component casing that accommodates optical components constituting the color separating optical system, a plurality of color modulators that modulate the respective color lights separated by the color separating optical system in accordance with image information, and a color combining optical system that combines the light beam modulated by the respective optical modulators to form an optical image, the position adjusting system adjusting the position of the color combining optical system relative to the optical component casing, comprising:

a laser beam irradiator that supplies white laser beam on an optical axis of light beam passing through the optical component casing;

a combined light sensor that causes the respective color lights generated by separating the white laser beam by the color separating optical system to be incident on a light-incident end surface of the color combining optical system and detects the light beam combined by the color combining optical system; and a position adjuster that three-dimensionally adjusts the position of the color combining optical system based on the combined light detected by the combined light sensor.

9. The position adjusting system according to claim 8, wherein the combined light sensor has an adjustment completion determining portion that determines completion of position adjustment of the color combining optical system while monitoring detection status of the combined light.

10. The position adjusting system according to claim 8, wherein the color combining optical system has a color-combining prism and a fixing plate adhered on the lower side of the prism by a light curing adhesive to be mechanically fixed to the optical component casing, and wherein the position adjuster has a prism holder that holds the prism and a light beam irradiator that irradiates light that cures the light curing adhesive.

11. A color combining optical system including a color-combining prism and a fixing plate adhered on the lower side of the prism by a adhesive to be mechanically fixed to an optical component casing, wherein the fixing plate has a spherical bulging portion formed on the fixing surface of the prism, and wherein the prism is adhered on the fixing plate while at least a part of the prism is in contact with the bulging portion.

12. The color combining optical system according to claim 11, wherein the adhesive is coated so that the gap between the lower side of the prism and the fixing plate formed by the bulging portion of the fixing plate is filled.

13. The color combining optical system according to claim 11, wherein the height of the bulging portion of the fixing plate is from 50 to 100% of maximum tolerance of cutting accuracy on the lower side of the prism, and wherein the curvature radius of the bulging portion is set so that the area of the bulging portion is from 1 to 50% of the area of the lower side of the prism.

14. A projector comprising a color combining optical system adjusted by the adjusting method of color combining optical system according to claim 1.

15. A position adjusting system of optical modulator used for producing a projector having a light source, a color separating optical system that separates a light beam irradiated by the light source into a plurality of color lights, an optical component casing that accommodates optical components constituting the color separating optical system, a plurality of color modulators that modulate the respective color lights separated by the color separating optical system in accordance with image information, and a color combining optical system that combines the light beam modulated by the respective optical modulators to form an optical image, the position adjusting system adjusting relative position of the plurality of optical modulators, comprising:

an adjuster body onto which an object to be adjusted including the optical modulator and the optical component casing is mounted to adjust position of the respective optical modulators;

a transmissive screen onto which an enlarged image projected from the object to be adjusted is formed;

an image sensor provided on the backside of the transmissive screen to detect the projection image projected on the transmissive screen; and an optical axis sensor that detects an illumination optical axis set in the optical component casing, wherein the optical modulator is adjusted by the adjustor body based on the illumination optical axis detected by the optical axis sensor.

16. The position adjusting system of optical modulator according to claim 15, the optical axis sensor including: a light beam output that outputs a linear light beam along the illumination optical axis; a light beam sensor that detects the light beam irradiated by the light beam output; and an optical axis processor that calculates the position of the illumination optical axis based on the light beam detected by the light beam sensor.

17. The position adjusting system of optical modulator according to claim 15, the adjuster body including: a holder that holds the optical modulator; a position adjuster that adjusts the position of the optical modulator held by the holder; and a light beam feeder that supplies adjusting light beam to the optical modulator, the holder having a light beam transmitting hole that introduces the light beam from the light beam feeder to an image formation area of the optical modulator.

18. The position adjusting system of optical modulator according to claim 17, wherein the optical modulator is fixed on a light-incident end surface of the color combining optical system with a light curing adhesive, and wherein the holder has a light irradiator that cures the light curing adhesive.

19. A position adjusting method of optical modulator used for producing a projector including a light source, a color separating optical system that separates a light beam irradiated by the light source into a plurality of color lights, an optical component casing that accommodates optical components constituting the color separating optical system, a plurality of optical modulators that modulate the respective color lights separated by the color separating optical system in accordance with image information, and a color combining optical system that combines the light beam modulated by the respective optical modulators to form an optical image, the position adjusting method adjusting the relative position of the plurality of optical modulators, comprising the steps of:

irradiating a laser beam along an illumination optical axis established in the optical component casing;

detecting the irradiated laser beam;

calculating the illumination optical axis of the optical component casing based on the detected laser beam; and adjusting the relative position of the optical modulators based on the position of the calculated optical axis of the optical component casing.

20. A projector comprising a plurality of optical modulators of which position is adjusted by the position adjusting method of optical modulator according to claim 19.

21. A projector, comprising:
the color combining optical system according to claim 11.

22. The projector according to claim 21, wherein the adhesive is coated so that the gap between the lower side of the prism and the fixing plate formed by the bulging portion of the fixing plate is filled.

23. The projector according to claim 21, wherein the height of the bulging portion of the fixing plate is from 50 to 100% of maximum tolerance of cutting accuracy on the lower side of the prism, and wherein the curvature radius of the bulging portion is set so that the area of the bulging portion is from 1 to 50% of the area of the lower side of the prism.

24. A projector, comprising:
the color combining optical system adjusted by the method according to claim 2.

25. A projector, comprising:
the color combining optical system adjusted by the method according to claim 3.

26. A projector, comprising:
the color combining optical system adjusted by the method according to claim 4.

27. A projector, comprising:
the color combining optical system adjusted by the method according to claim 5.

28. A projector, comprising:
the color combining optical system adjusted by the method according to claim 6.

29. A projector, comprising:
the color combining optical system adjusted by the method according to claim 7.

* * * * *